United States Patent
Ide

(10) Patent No.: US 9,893,617 B2
(45) Date of Patent: Feb. 13, 2018

(54) ELECTRIC POWER CONVERSION SYSTEM

(71) Applicant: TOYOTA JIDOSHA KABUSHIKI KAISHA, Toyota-shi, Aichi-ken (JP)

(72) Inventor: Akihiko Ide, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 124 days.

(21) Appl. No.: 15/131,155

(22) Filed: Apr. 18, 2016

(65) Prior Publication Data

US 2016/0315479 A1    Oct. 27, 2016

(30) Foreign Application Priority Data

Apr. 21, 2015   (JP) ................... 2015-086867

(51) Int. Cl.
*H02J 1/00*   (2006.01)
*H02M 3/158*  (2006.01)

(52) U.S. Cl.
CPC .................. *H02M 3/158* (2013.01)

(58) Field of Classification Search
CPC ................................................. H02M 3/158
USPC ...... 307/82, 71, 52, 10.1, 9.1; 320/103, 104; 327/170, 172–177
See application file for complete search history.

(56) References Cited

U.S. PATENT DOCUMENTS

2013/0134786 A1* 5/2013 Ishigaki ............... H02M 3/158
307/71
2016/0001660 A1* 1/2016 Tomura ................ H02J 1/00
307/10.1

FOREIGN PATENT DOCUMENTS

JP    2012-70514     4/2012
JP    2014-193090    10/2014

* cited by examiner

*Primary Examiner* — Thomas Skibinski
(74) *Attorney, Agent, or Firm* — Finnegan, Henderson, Farabow, Garrett & Dunner, LLP

(57) ABSTRACT

An electronic control unit of an electric power conversion system is configured to, when voltages of first and second batteries are stepped up in parallel and a temperature of a common switching element exceeds a threshold temperature, execute on time change control such that following conditions i) and ii) are satisfied: i) a trailing edge of one of the first and second PWM signals and a leading edge of the other one of the first and the second PWM signals connect with each other; and ii) the sum of the on time of the first and second PWM signals in a single PWM control period falls within a range from the single PWM control period to an allowable period. The electronic control unit is configured to change an on time of at least one of the first and second PWM signal in the on time change control.

7 Claims, 16 Drawing Sheets

⟨PARALLEL STEP-UP OPERATION, CHARGE OF CNV1 AND CNV2⟩

⟨PARALLEL STEP-UP OPERATION, DISCHARGE OF CNV1 AND CNV2⟩

FIG. 4
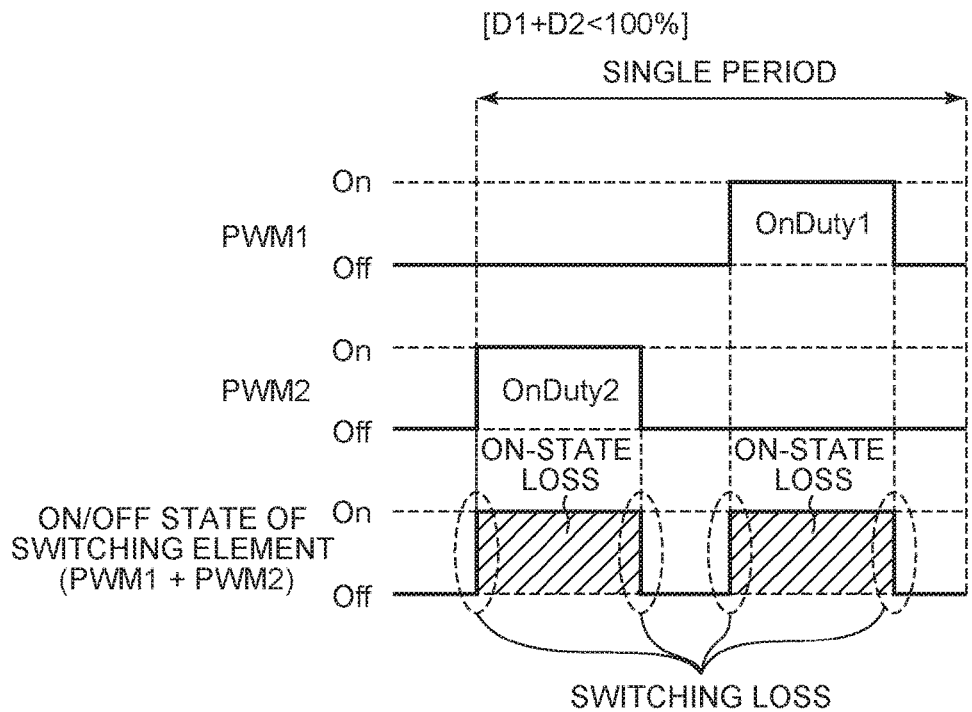
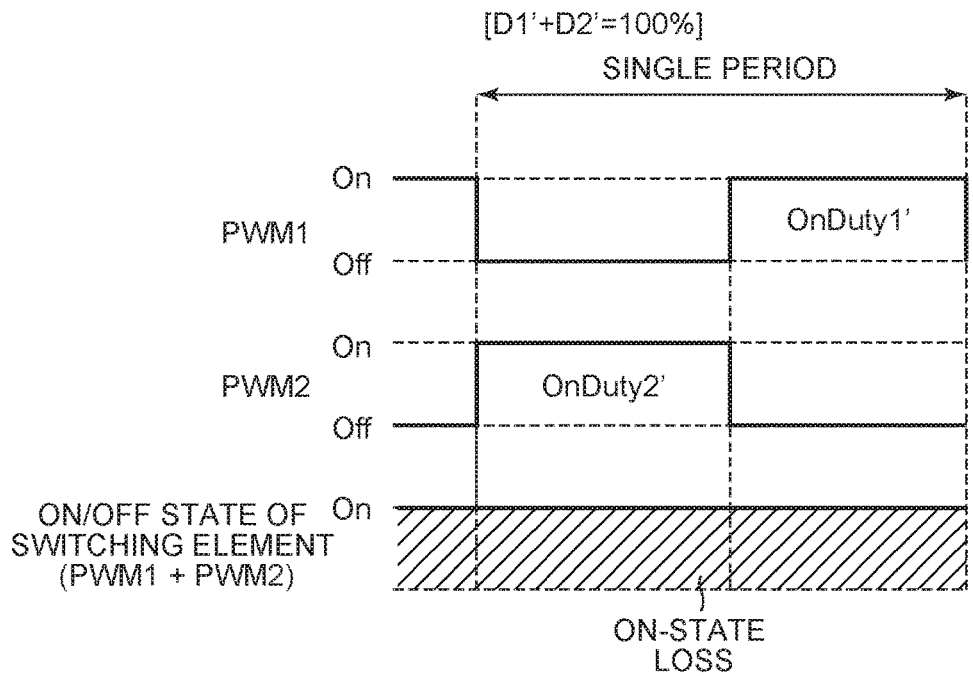

FIG. 6
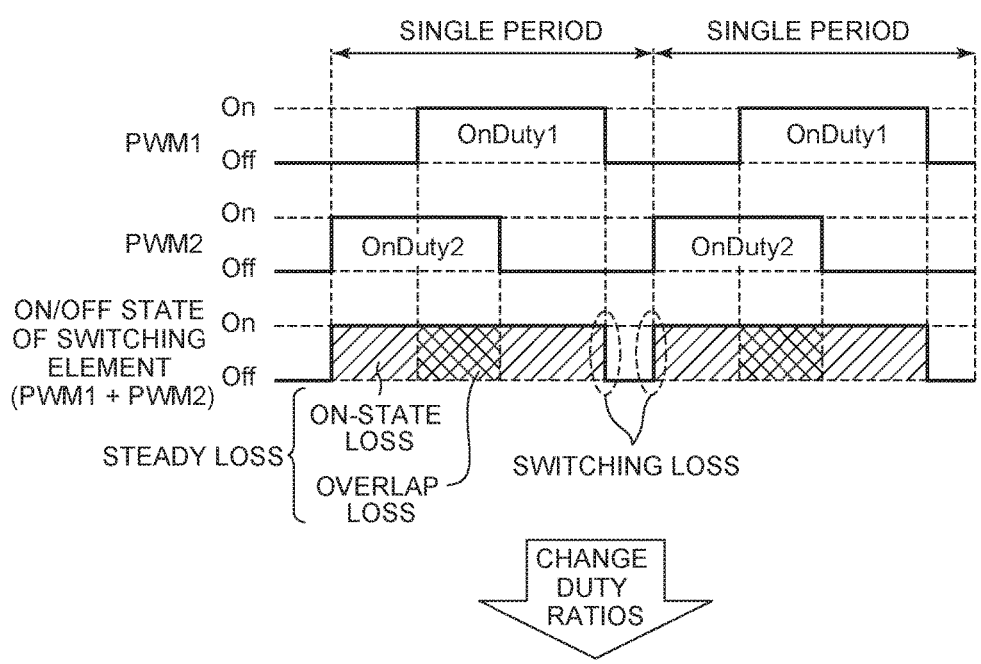
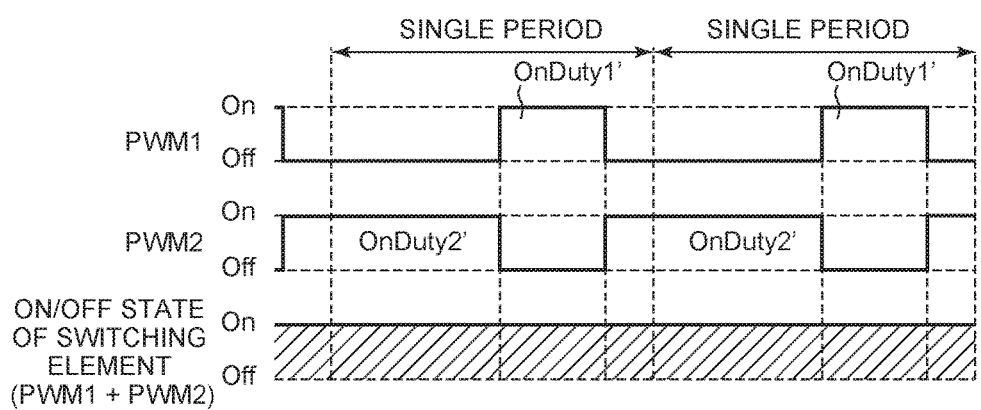

FIG. 8
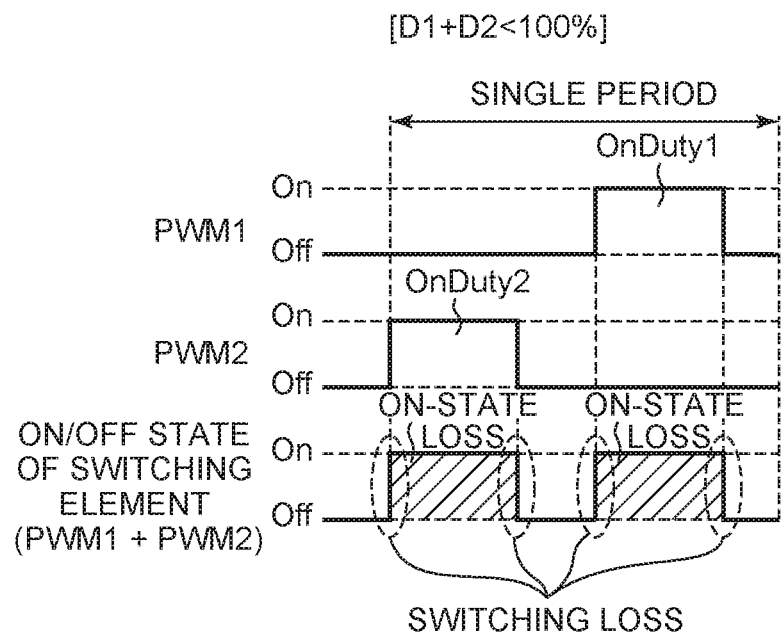
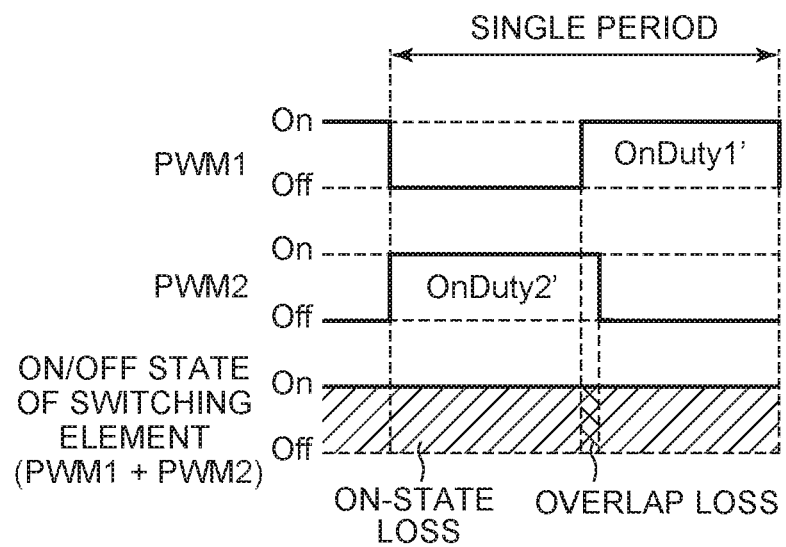

FIG. 10

| D1 [rate] | D2 [rate] | D1+D2 [rate] | | VH [V] | | IL1 [A] | IL1 [A] | | Eon 1 [mJ] | Eoff 1 [mJ] | Eon 2 [mJ] | Eoff 2 [mJ] | Esat 1 [mJ] | Esat 2 [mJ] |
|---|---|---|---|---|---|---|---|---|---|---|---|---|---|---|
| 5%  | 37% | 42%  | → | 316  | → | 166.7 | 250.0 | → | 2.9  | 4.5  | 4.3  | 6.7   | 1.7  | 18.3 |
| 10% | 40% | 50%  | → | 333  | → | 166.7 | 250.0 | → | 3.1  | 4.7  | 4.6  | 7.1   | 3.3  | 20.0 |
| 15% | 43% | 58%  | → | 353  | → | 166.7 | 250.0 | → | 3.2  | 5.0  | 4.9  | 7.5   | 5.0  | 21.7 |
| 20% | 47% | 67%  | → | 375  | → | 166.7 | 250.0 | → | 3.4  | 5.3  | 5.2  | 8.0   | 6.7  | 23.3 |
| 25% | 50% | 75%  | → | 400  | → | 166.7 | 250.0 | → | 3.7  | 5.7  | 5.5  | 8.5   | 8.3  | 25.0 |
| 30% | 53% | 83%  | → | 429  | → | 166.7 | 250.0 | → | 3.9  | 6.1  | 5.9  | 9.1   | 10.0 | 26.7 |
| 35% | 57% | 92%  | → | 462  | → | 166.7 | 250.0 | → | 4.2  | 6.5  | 6.3  | 9.8   | 11.7 | 28.3 |
| 40% | 60% | 100% | → | 500  | → | 166.7 | 250.0 | → | 4.6  | 7.1  | 6.9  | 10.6  | 13.3 | 30.0 |
| 45% | 63% | 108% | → | 545  | → | 166.7 | 250.0 | → | 5.0  | 7.7  | 7.5  | 11.6  | 15.0 | 31.7 |
| 50% | 67% | 117% | → | 600  | → | 166.7 | 250.0 | → | 5.5  | 8.5  | 8.3  | 12.8  | 16.7 | 33.3 |
| 55% | 70% | 125% | → | 667  | → | 166.7 | 250.0 | → | 6.1  | 9.4  | 9.2  | 14.2  | 18.3 | 35.0 |
| 60% | 73% | 133% | → | 750  | → | 166.7 | 250.0 | → | 6.9  | 10.6 | 10.3 | 15.9  | 20.0 | 36.7 |
| 65% | 77% | 142% | → | 857  | → | 166.7 | 250.0 | → | 7.9  | 12.1 | 11.8 | 18.2  | 21.7 | 38.3 |
| 70% | 80% | 150% | → | 1000 | → | 166.7 | 250.0 | → | 9.2  | 14.2 | 13.8 | 21.3  | 23.3 | 40.0 |
| 75% | 83% | 158% | → | 1200 | → | 166.7 | 250.0 | → | 11.0 | 17.0 | 16.5 | 25.5  | 25.0 | 41.7 |
| 80% | 87% | 167% | → | 1500 | → | 166.7 | 250.0 | → | 13.8 | 21.3 | 20.6 | 31.9  | 26.7 | 43.3 |
| 85% | 90% | 175% | → | 2000 | → | 166.7 | 250.0 | → | 18.3 | 28.3 | 27.5 | 42.5  | 28.3 | 45.0 |
| 90% | 93% | 183% | → | 3000 | → | 166.7 | 250.0 | → | 27.5 | 42.5 | 41.3 | 63.8  | 30.0 | 46.7 |
| 95% | 97% | 192% | → | 6000 | → | 166.7 | 250.0 | → | 55.0 | 85.0 | 82.5 | 127.5 | 31.7 | 48.3 |

POWER LOSSES DUE TO D1 AND D2

FIG. 11

| D1 [rate] | D2 [rate] | D1+D2 [rate] | | Etotal [mJ] | | Etotal' [mJ] | delta [mJ] | | Etotal" [mJ] | delta [mJ] |
|---|---|---|---|---|---|---|---|---|---|---|
| 5% | 37% | 42% | ↑ | 38.4 | ↑ | 28.8 | -9.6 | ↑ | 43.3 | 14.5 |
| 10% | 40% | 50% | ↑ | 42.8 | ↑ | 32.6 | -10.1 | ↑ | 43.3 | 10.7 |
| 15% | 43% | 58% | ↑ | 47.3 | ↑ | 36.5 | -10.7 | ↑ | 43.3 | 6.8 |
| 20% | 47% | 67% | ↑ | 51.9 | ↑ | 40.5 | -11.4 | ↑ | 43.3 | 2.8 |
| 25% | 50% | 75% | ↑ | 56.7 | ↑ | 44.5 | -12.2 | ↑ | 43.3 | -1.2 |
| 30% | 53% | 83% | ↑ | 61.7 | ↑ | 48.6 | -13.0 | ↑ | 43.3 | -5.3 |
| 35% | 57% | 92% | ↑ | 66.9 | ↑ | 52.9 | -14.0 | ↑ | 43.3 | -9.6 |
| 40% | 60% | 100% | ↑ | 72.5 | ↑ | 43.3 | -29.2 | ↑ | 43.3 | 0.0 |
| 45% | 63% | 108% | ↑ | 78.5 | ↑ | 46.7 | -31.8 | ↑ | 43.3 | -3.3 |
| 50% | 67% | 117% | ↑ | 85.0 | ↑ | 50.0 | -35.0 | ↑ | 43.3 | -6.7 |
| 55% | 70% | 125% | ↑ | 92.2 | ↑ | 53.3 | -38.9 | ↑ | 43.3 | -10.0 |
| 60% | 73% | 133% | ↑ | 100.4 | ↑ | 56.7 | -43.8 | ↑ | 43.3 | -13.3 |
| 65% | 77% | 142% | ↑ | 110.0 | ↑ | 60.0 | -50.0 | ↑ | 43.3 | -16.7 |
| 70% | 80% | 150% | ↑ | 121.7 | ↑ | 63.3 | -58.3 | ↑ | 43.3 | -20.0 |
| 75% | 83% | 158% | ↑ | 136.7 | ↑ | 66.7 | -70.0 | ↑ | 43.3 | -23.3 |
| 80% | 87% | 167% | ↑ | 157.5 | ↑ | 70.0 | -87.5 | ↑ | 43.3 | -26.7 |
| 85% | 90% | 175% | ↑ | 190.0 | ↑ | 73.3 | -116.7 | ↑ | 43.3 | -30.0 |
| 90% | 93% | 183% | ↑ | 251.7 | ↑ | 76.7 | -175.0 | ↑ | 43.3 | -33.3 |
| 95% | 97% | 192% | ↑ | 430.0 | ↑ | 80.0 | -350.0 | ↑ | 43.3 | -36.7 |

LOSS AFTER PHASE SHIFT CONTROL

LOSS AFTER ON TIME CHANGE CONTROL

LOSS INCREASES THROUGH ON TIME CHANGE CONTROL

LOSS REDUCES THROUGH ON TIME CHANGE CONTROL

LOSS REDUCES THROUGH ON TIME CHANGE CONTROL

FIG. 17
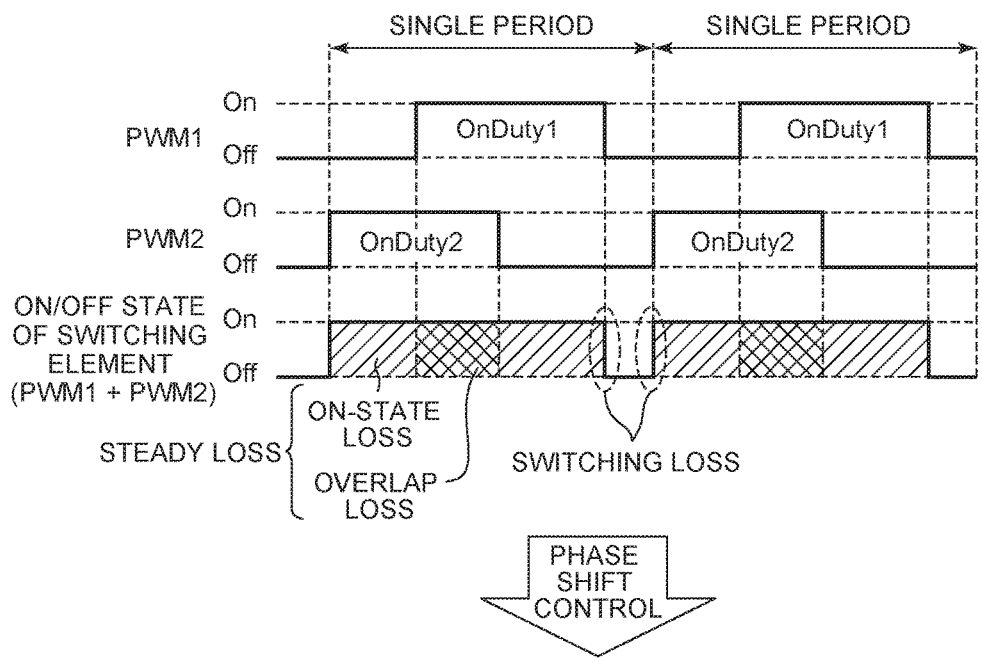
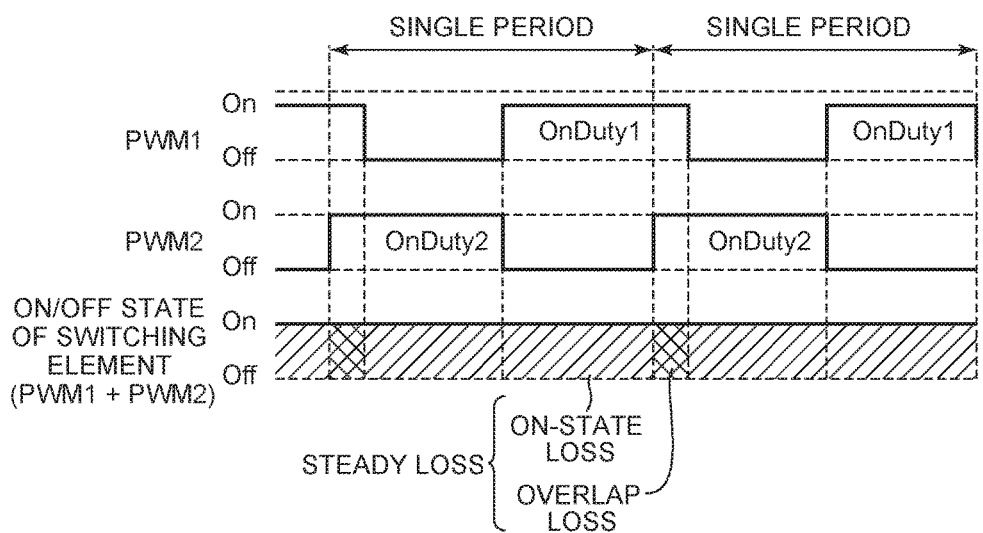

ELECTRIC POWER CONVERSION SYSTEM

INCORPORATION BY REFERENCE

The disclosure of Japanese Patent Application No. 2015-086867 filed on Apr. 21, 2015 including the specification, drawings and abstract is incorporated herein by reference in its entirety.

BACKGROUND

1. Field

The disclosure relates to an electric power conversion system that is able to step up or step down voltage for two direct-current power supplies in parallel with each other.

2. Description of Related Art

In a hybrid vehicle or an electric vehicle, which uses a rotary electric machine as a driving source, the rotary electric machine is driven by alternating-current power that is converted by an inverter from the direct-current power of a battery. In addition, a step-up/step-down converter is provided between the battery and the inverter. The step-up/step-down converter steps up a battery voltage or steps down electric power regenerated by the rotary electric machine.

A voltage converter is, for example, described in Japanese Patent Application Publication No. 2014-193090 (JP 2014-193090 A) as the one that has the extended function of the step-up/step-down converter. The voltage converter includes four switching elements, and is connected to two batteries. The voltage converter is able to switch the two batteries between series connection and parallel connection.

The above-described voltage converter steps up or steps down voltage for the two batteries in parallel with each other at the time of the parallel connection (parallel mode). Step-up/step-down operation is controlled via a PWM signal indicating a duty ratio to each of step-up/step-down circuits. The duty ratio is the ratio of an on time to a single PWM control period. The voltage converter described in JP 2014-193090 A has such a circuit configuration that the switching elements are shared between two step-up/step-down circuits. The on/off operation of each switching element is controlled in accordance with the logical addition of both PWM signals based on so-called principle of superposition. For example, when a predetermined one of the switching elements is controlled based on the PWM signal PWM1 for one of the step-up/step-down circuits and the PWM signal PWM2 for the other one of the step-up/step-down circuits, the on/off operation of the predetermined one of the switching elements is controlled by a composite signal of the PWM1 and the PWM2.

A power loss (hereinafter, also simply referred to as loss) arises with the on/off operation of each switching element. Specifically, examples of the loss include a switching loss (turn-on loss) that arises at the time when each switching element switches from an off state (interruption of current) to an on state (conduction of current) and a switching loss (turn-off loss) that arises at the time when each switching element switches from the on state to the off state, as shown in the upper timing chart of FIG. 17. Another example of the loss includes a steady loss that arises due to an on voltage (collector-to-emitter saturation voltage) at the time when each switching element is in the on state and a current flowing at this time.

The steady loss is classified into an overlap loss and an on-state loss. The overlap loss is caused when currents from the two step-up/step-down circuits are overlappingly supplied to each switching element. The on-state loss is caused when only current of one of the two step-up/step-down circuits is supplied to each switching element. Because of the magnitude relation in current, the overlap loss is larger than the on-state loss.

Each switching element is heated by the loss that arises in the switching element. In order to prevent overheating of each switching element, the phases of the PWM signals for the two step-up/step-down circuits are shifted from each other (phase shift control) in JP 2014-193090 A.

In phase shift control, as shown in the lower timing chart of FIG. 17, one or both of the phases of the PWM signals PWM1, PWM2 are shifted such that the leading edge of an on duty (OnDuty1) of the PWM signal PWM1 is brought into coincidence (connection) with the trailing edge of an on duty (OnDuty2) of the PWM signal PWM2. Thus, the number of times of switching is reduced as compared to the PWM signals shown in the upper timing chart of FIG. 17, with the result that the switching loss is reduced. In addition, the duration of the overlap loss is also shortened.

SUMMARY

Incidentally, a further reduction of the loss is desired in order to prevent overheating of switching elements. The disclosure provides an electric power conversion system that is able to reduce a power loss in each switching element to which current is supplied from two step-up circuits as compared to the existing power conversion system, particularly, at the time of parallel step-up operation.

The disclosure relates to an electric power conversion system. The system includes a first battery, a second battery, and a voltage converter. The voltage converter includes a plurality of switching elements. The voltage converter bidirectionally steps up or steps down voltage between each of the first and second batteries and an output line by turning on or off the plurality of switching elements in accordance with PWM signals. At the time of parallel step-up operation in which voltages of the first and second batteries are stepped up in parallel with each other, the voltage converter is configured to step up the voltage of the first battery by using a first step-up circuit and output the stepped-up voltage to the output line, and is configured to step up the voltage of the second battery by using a second step-up circuit and output the stepped-up voltage to the output line. The electric power conversion system further includes an electronic control unit configured to control the first and second step-up circuits by generating a first PWM signal for executing step-up control over the first step-up circuit and a second PWM signal for executing step-up control over the second step-up circuit. The plurality of switching elements include a common switching element that is supplied with current from both the first and second step-up circuits at the time of the parallel step-up operation. The electronic control unit is configured to, at the time of the parallel step-up operation and when a temperature of the common switching element exceeds a threshold temperature, execute on time change control for changing an on time of at least one of the first PWM signal and the second PWM signal such that a trailing edge of one of the first PWM signal and the second PWM signal and a leading edge of the other one of the first PWM signal and the second PWM signal connect with each other and the sum of the on time of the first PWM signal and the on time of the second PWM signal in a single PWM control period falls within a range from the single PWM control period to an allowable period obtained by adding a predetermined time to the single PWM control period.

In the above system, the electronic control unit may be configured to execute the on time change control such that the sum of the on time of the first PWM signal and the on time of the second PWM signal in the single PWM control period coincides with the single PWM control period.

In the above system, the electronic control unit may be configured to, when the sum of the on time of the first PWM signal and the on time of the second PWM signal in the single PWM control period before execution of the on time change control exceeds the single PWM control period, set the allowable period such that the allowable period is shorter than the sum of the on time of the first PWM signal and the on time of the second PWM signal.

In the above system, the electronic control unit may be configured to execute the on time change control when the sum of the on time of the first PWM signal and the on time of the second PWM signal in the single PWM control period before execution of the on time change control is shorter than the single PWM control period and when a power loss that arises in the common switching element based on the first PWM signal and the second PWM signal after execution of the on time change control is smaller than a power loss that arises in the common switching element based on the first PWM signal and the second PWM signal before execution of the on time change control.

In the above system, the electronic control unit may be configured to execute the on time change control when a power loss that arises in the common switching element based on the first PWM signal and the second PWM signal after execution of the on time change control is smaller than a power loss that arises in the common switching element at the time when phase shift control for shifting the trailing edge of at least one of the first PWM signal and the second PWM signal to the leading edge of the other one of the first PWM signal and the second PWM signal without extending or shortening the on time of the first PWM signal before execution of the on time change control or the on time of the second PWM signal before execution of the on time change control.

In the above system, the electric power conversion system may further include an inverter configured to convert direct-current power, output from the first and second step-up circuits, to alternating-current power, and the electronic control unit may be configured to change a conduction ratio in the inverter in response to a change between output voltages of the first step-up circuit and second step-up circuit before execution of the on time change control and output voltages of the first step-up circuit and second step-up circuit after execution of the on time change control.

In the above system, the electric power conversion system may further include a rotary electric machine configured to be supplied with alternating-current power converted by the inverter, and the electronic control unit may be configured to change the conduction ratio in the inverter in response to a change in efficiency of the rotary electric machine commensurate with a change between the output voltages of the first step-up circuit and second step-up circuit before execution of the on time change control and the output voltages of the first step-up circuit and second step-up circuit after execution of the on time change control.

According to the system, it is possible to reduce the power loss in the switching element that is supplied with current from two step-up circuits as compared to the existing system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a view that illustrates a first example of on time change control according to the embodiment;

FIG. 6 is a view that illustrates a third example of on time change control according to the embodiment;

FIG. 8 is a view that illustrates a fifth example of on time change control according to the embodiment;

FIG. 10 is the first half of a table that illustrates calculation of a loss in a common switching element;

FIG. 11 is the second half of the table that illustrates calculation of a loss in the common switching element;

FIG. 17 is a view that illustrates phase shift control at the time when the sum of the on time of PWM1 and the on time of PWM2 exceeds a single PWM control period.

DETAILED DESCRIPTION OF EMBODIMENTS

Figure 1:
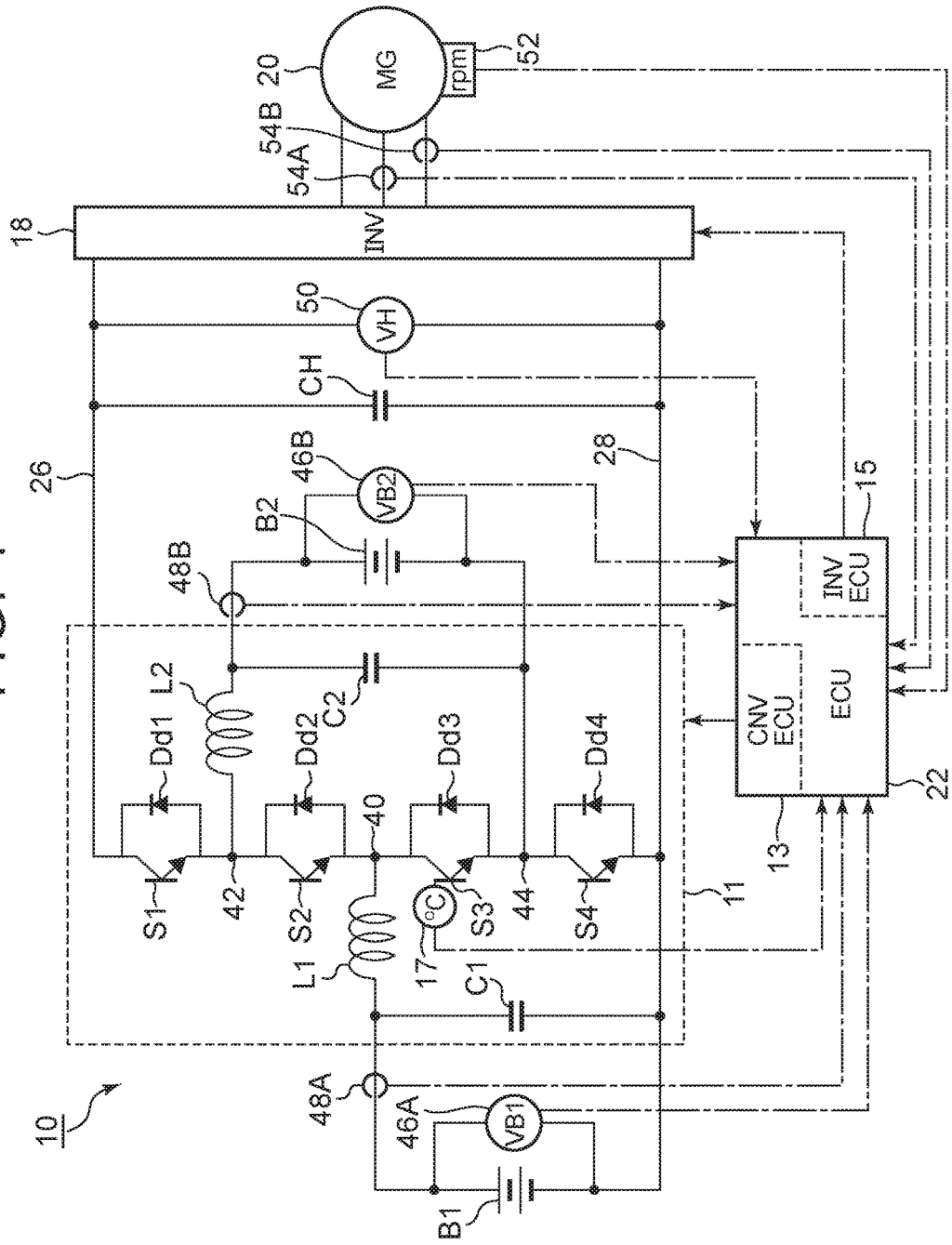
FIG. 1 is a view that illustrates an electric power conversion system according to an embodiment.

Hereinafter, an embodiment of the disclosure will be described with reference to the accompanying drawings. FIG. 1 illustrates a configuration view of an electrical system of a vehicle, including an electric power conversion system 10 according to the present embodiment. The alternate long and short dashes lines in FIG. 1 represent signal lines. In FIG. 1, for the sake of easy understanding, part of components not associated with electric power conversion are not shown in the drawing.

The electric power conversion system 10 includes a first battery B1, a second battery B2, a voltage converter 11, an inverter 18 and a controller 22. The electric power conversion system 10 is mounted on a vehicle, such as a hybrid vehicle and an electric vehicle. A rotary electric machine 20 that serves as a drive source is mounted on the vehicle. The controller 22 may be a computer called electronic control unit (ECU). The controller 22 includes, for example, a CPU that is an arithmetic circuit, a storage unit, such as a memory, and a device and sensor interface, which are connected with each other via an internal bus. Hereinafter, the controller 22 is referred to as ECU 22.

As shown in FIG. 1, each of the first battery B1 and the second battery B2 is separately connected to the voltage converter 11. The voltage converter 11 steps up direct-current voltages VB1, VB2 from the first battery B1 and the second battery B2, and outputs the stepped-up direct-current voltages VB1, VB2 to the inverter 18.

The inverter 18 is a three-phase inverter. The output side of the inverter 18 is connected to the rotary electric machine 20. The inverter 18 converts direct-current power, stepped up by the voltage converter 11, to three-phase alternating-current power, and outputs the three-phase alternating-current power to the rotary electric machine 20. Thus, the rotary electric machine 20 is driven to rotate. The driving force of the rotary electric machine 20 is transmitted to drive wheels (not shown).

During braking of the vehicle, regenerative braking is carried out by the rotary electric machine 20. Regenerated electric power obtained at this time is converted by the inverter 18 from alternating-current power to direct-current power, the direct-current power is stepped down by the voltage converter 11, and the stepped-down direct-current power is supplied to the first battery B1 and the second battery B2.

The ECU 22 includes a CNV ECU 13 that controls the on/off states of switching elements S1 to S4 of the voltage converter 11. By controlling the on/off states of the switching elements S1 to S4, step-up/step-down (voltage conversion) operation and series-parallel switching operation over the voltage converter 11 are controlled.

The ECU 22 further includes an INV ECU 15 that controls the on/off states of switching elements (not shown) of the inverter 18. By controlling the on/off states of the switching elements of the inverter 18, DC-AC conversion or AC-DC conversion of the inverter 18 is controlled.

In this way, the ECU 22 controls the driving of the rotary electric machine 20 by controlling the voltage converter 11 and the inverter 18 via the CNV ECU 13 and the INV ECU 15.

The ECU 22 is able to execute overheating protection control over a specific switching element at the time of parallel step-up operation. The parallel step-up operation means voltage conversion for stepping up the voltage of the first battery B1 and the voltage of the second battery B2 in parallel with each other. The specific switching element means a switching element that is supplied with current from both a first step-up circuit and a second step-up circuit at the time of parallel step-up operation. The first step-up circuit steps up the voltage of the first battery B1. The second step-up circuit steps up the voltage of the second battery B2. In the present embodiment, such a switching element is referred to as common switching element. As will be described later, in the example shown in FIG. 1, the switching element S3 is the common switching element.

When the temperature of the common switching element S3 exceeds a predetermined threshold temperature, the CNV ECU 13 changes the on time of at least one of a first PWM signal PWM1 and a second PWM signal PWM2 as overheating protection control. The first PWM signal PWM1 is used to control the step-up operation of the first step-up circuit. The second PWM signal PWM2 is used to control the step-up operation of the second step-up circuit. Specifically, the CNV ECU 13 changes the on time of at least one of the PWM1 and the PWM2 such that the trailing edge of one of the PWM1 and the PWM2 connects with the leading edge of the other one of the PWM1 and the PWM2 and the sum of the on time of the PWM1 and the on time of the PWM2 in a single PWM control period falls within a range from the single PWM control period to an allowable period obtained by adding a predetermined time to the single PWM control period.

By executing the above-described overheating protection control, the common switching element S3 is kept in the on state over the single PWM control period. Thus, a switching loss in the common switching element S3 is avoided. In addition, the on time of the PWM1 and the on time of the PWM2 alternately appear without any overlap between the on time of the PWM1 and the on time of the PWM2 or the on time of the PWM1 and the on time of the PWM2 appear in a state where an overlap period is shorter than that before on time change control if there is an overlap between the on time of the PWM1 and the on time of the PWM2. Thus, an overlap loss in the common switching element S3 is avoided or at least reduced. By such loss reduction, it is possible to prevent overheating of the common switching element S3.

Each of the first battery B1 and the second battery B2 is a direct-current power supply formed of a secondary battery, and is formed of, for example, a lithium-ion storage battery or a nickel-metal hydride storage battery. At least one of the first battery B1 and the second battery B2 may be an electrical storage element, such as an electric double layer capacitor, instead of a secondary battery.

The voltage converter 11 includes the switching elements S1 to S4. Step-up/step-down (voltage conversion) operation is bidirectionally performed between each of the first battery B1 and the second battery B2 and an output line (high-voltage line 26) by controlling the on/off states of the switching elements S1 to S4 in response to the PWM signals that are generated by the CNV ECU 13. In addition, the voltage converter 11 switches connection of the first battery B1 and the second battery B2 with the high-voltage line 26 between series connection and parallel connection.

Each of the switching elements S1 to S4 of the voltage converter 11 is, for example, a transistor element, such as an IGBT. The switching elements S1 to S4 are connected in series with each other such that the direction from the high-voltage line 26 toward a reference line 28 is a forward direction. The high-voltage line 26 is the output line of the voltage converter 11. In addition, diodes Dd1 to Dd4 are respectively connected in antiparallel with the switching elements S1 to S4.

The voltage converter 11 includes a first reactor L1 and a first capacitor C1. The first reactor L1 is connected in series with the first battery B1. The first capacitor C1 is connected in parallel with the first battery B1. The voltage converter 11 includes a second reactor L2 and a second capacitor C2. The second reactor L2 is connected in series with the second battery B2. The second capacitor C2 is connected in parallel with the second battery B2.

The first battery B1 is connected between a connection point (node) 40 and the reference line 28. The connection point (node) 40 is provided between the second switching element S2 and the third switching element S3 from the high-voltage line 26 side. In addition, the second battery B2 is connected between a connection point 42 and a connection point 44. The connection point 42 is provided between the first switching element S1 and the second switching element S2 from the high-voltage line 26 side. The connection point 44 is provided between the third switching element S3 and the fourth switching element S4 from the high-voltage line 26 side.

The inverter 18 converts direct-current power, stepped up by the voltage converter 11, to three-phase alternating-current power by turning on or off the switching elements (not shown), and supplies the three-phase alternating-current power to the rotary electric machine 20. The inverter 18 also converts regenerated electric power (three-phase alternating-current power), regenerated by the rotary electric machine 20, to direct-current power by turning on or off the switching elements (not shown), and supplies the direct-current power to the first battery B1 and the second battery B2 via the voltage converter 11.

The controller 22, as will be described later, executes various operation controls over the vehicle, including voltage conversion and switching of power supply connection over the voltage converter 11.

The storage unit of the ECU 22 stores a control program for the switching elements S1 to S4, a VH* map (described later), a phase shift program (described later), an on time change program (described later), and the like.

The ECU 22 receives signals from various sensors via the device and sensor interface. Specifically, the ECU 22 receives detected values from battery voltage sensors 46A, 46B and battery current sensors 48A, 48B as the signals associated with the first battery B1 and the second battery B2. The battery voltage sensors 46A, 46B respectively measure battery voltage values VB1,VB2. The battery current sensors 48A, 48B respectively measure battery current values IL1, IL2. The ECU 22 receives a detected value from an output voltage sensor 50 as the signal associated with the output voltage of the voltage converter 11. The output voltage sensor 50 is connected in parallel with a smoothing capacitor CH, and measures a potential difference VH (output voltage) between the high-voltage line 26 and the reference line 28.

The ECU 22 receives an actual rotation angle of the rotary electric machine 20 and detected signals of three-phase alternating currents from a rotation speed sensor 52 and current sensors 54A 54B as the signals associated with the rotary electric machine 20. The ECU 22 receives pedal depression amounts from an accelerator pedal depression amount sensor and a brake pedal depression amount sensor (not shown) as other vehicle information.

In addition, the ECU 22 receives a temperature signal from a temperature sensor 17. The temperature sensor 17 detects the temperature of the switching element S3 that is the common switching element.

The ECU 22 includes the CNV ECU 13 and the INV ECU 15. The ECU 22, the CNV ECU 13 and the INV ECU 15 may be incorporated in a single computer. Part of resources, such as the CPU and the memory, are allocated to the CNV ECU 13 and the INV ECU 15, so the CNV ECU 13 and the INV ECU 15 each are able to operate independently of the ECU 22. The ECU 22, the CNV ECU 13 and the INV ECU 15 may be respectively formed of separate computers.

The ECU 22 transmits control commands to the CNV ECU 13 and the INV ECU 15. For example, the ECU 22 transmits a step-up voltage command value VH* to the CNV ECU 13 based on the VH* map (described later). The ECU 22 transmits a command frequency of alternating-current power to the INV ECU 15 based on an actual rotation speed of the rotary electric machine 20, a torque command value, and the like. The CNV ECU 13 and the INV ECU 15 may communicate with each other. As will be described later, a step-up voltage command value VH*' changed as a result of on time change control over the PWM signals may be transmitted from the CNV ECU 13 to the INV ECU 15.

The INV ECU 15 controls the inverter 18 by executing a control program for the switching elements (not shown), stored in the storage unit of the computer, current compensation control (described later), and loss compensation control (described later).

The CNV ECU 13 controls the voltage converter 11 by executing the control program for the switching elements S1 to S4, an overheating protection control program (described later), and the like, stored in the storage unit of the computer. As will be described later, at the time of parallel step-up operation, the CNV ECU 13 generates the PWM signals PWM1, PWM2 for step-up control, and outputs the PWM signals PWM1, PWM2 respectively to the first step-up circuit and the second step-up circuit.

The detailed operation of the voltage converter 11 is already known from the above-described JP 2014-193090 A, or the like, so only a parallel step-up mode associated with overheating protection control over the common switching element (described later) will be simply described.

The step-up operation mainly includes two processes, that is, a charge process and a discharge process. In the charge process, electric charge of the battery is accumulated in the reactor. In the discharge process, electric charge accumulated in the reactor and electric charge of the battery are superimposed and discharged to a load.

Figure 2:
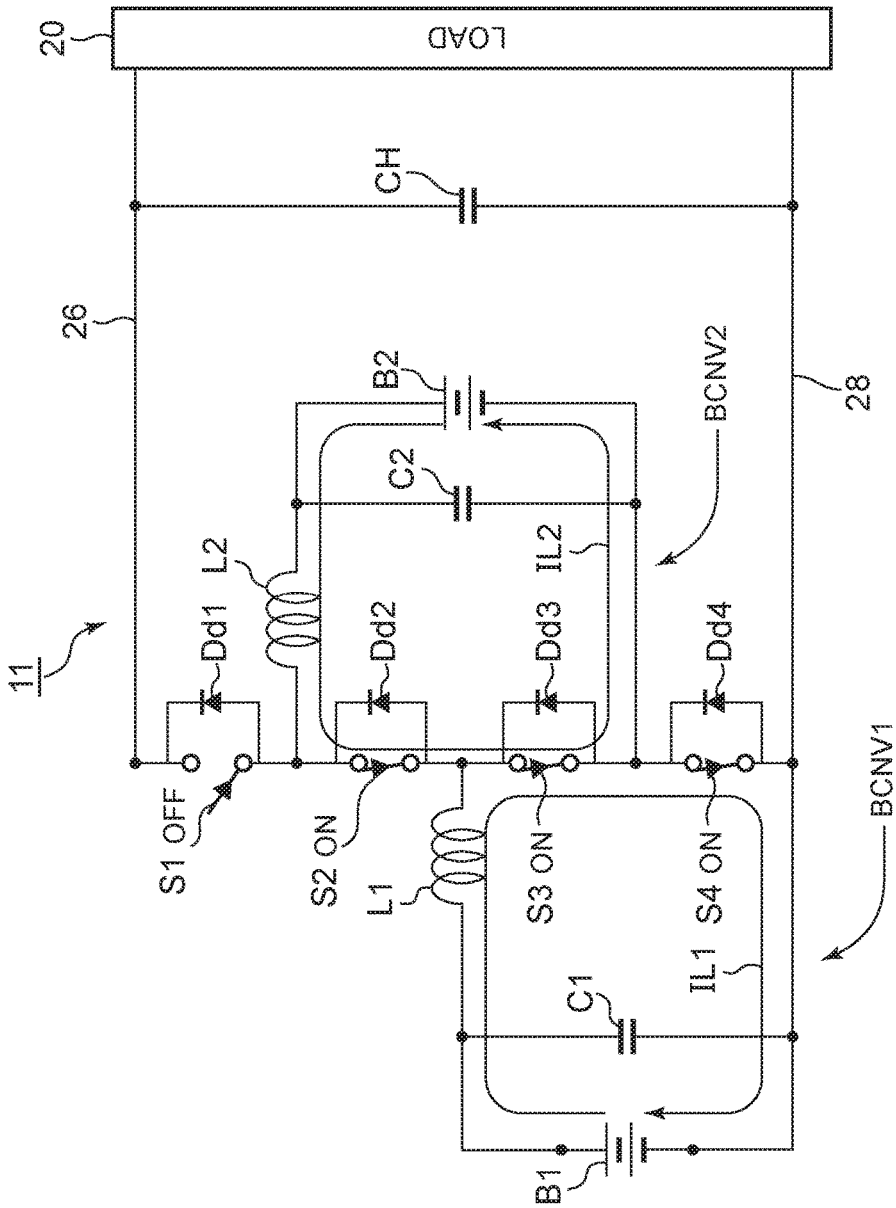
FIG. 2 is a view that illustrates the operation of a voltage converter according to the embodiment at the time of parallel step-up operation when first and second step-up circuits are in a charge process.
Figure 3:
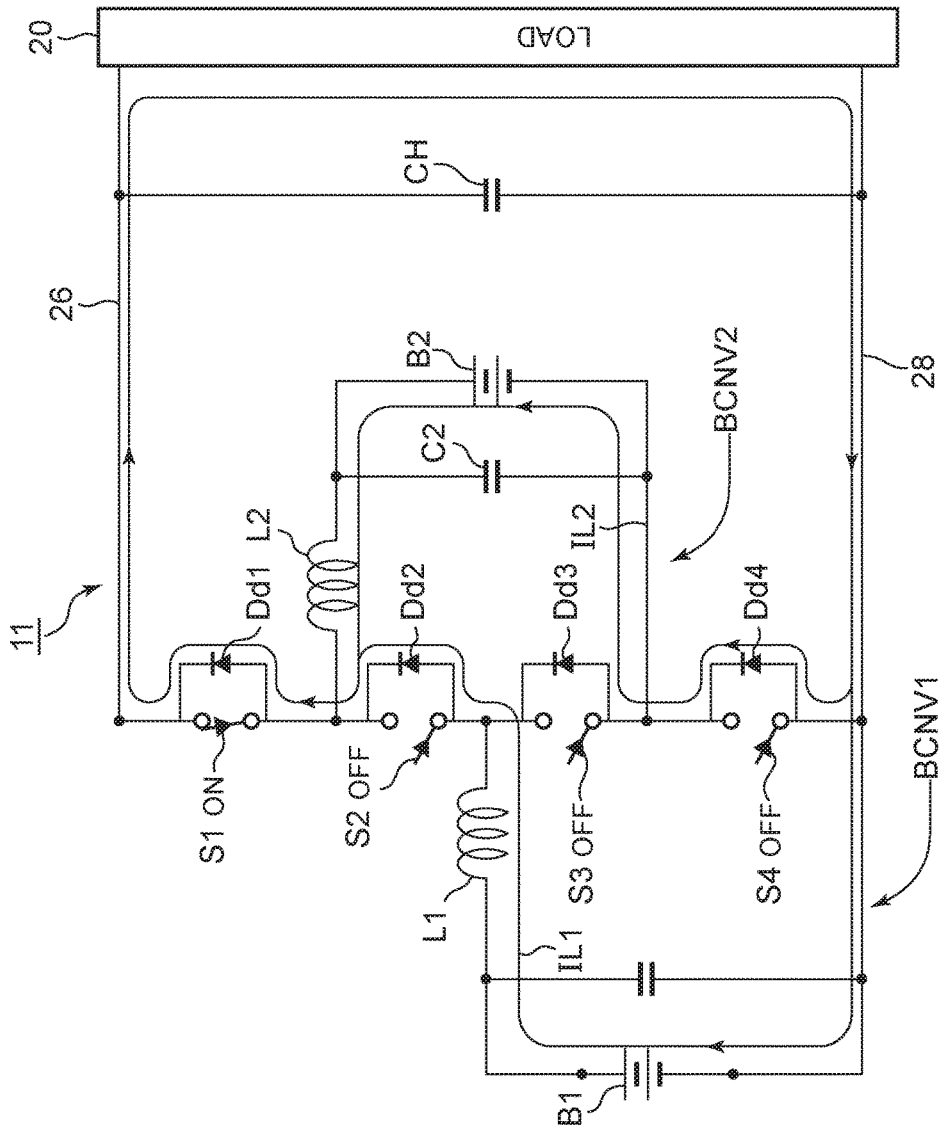
FIG. 3 is a view that illustrates the operation of the voltage converter according to the embodiment at the time of parallel step-up operation when the first and second step-up circuits are in a discharge process.

In the parallel step-up mode, the above-described step-up operations are performed in parallel with each other. That is, as shown in FIG. 2 and FIG. 3, a first step-up circuit BCNV1 and a second step-up circuit BCNV2 are provided in the electric power conversion system 10. In the first step-up circuit BCNV1, the voltage of the first battery B1 is stepped up by the voltage converter 11, and the stepped-up voltage is output to the high-voltage line 26 (output line). In the second step-up circuit BCNV2, the voltage of the second battery B2 is stepped up by the voltage converter 11, and the stepped-up voltage is output to the high-voltage line 26 (output line). In addition, a charge and a discharge are performed in each of these circuits.

FIG. 2 illustrates the charge process at the time of parallel step-up operation. In the first step-up circuit BCNV1, the switching elements S3, S4 turn on, with the result that a loop path from the first battery B1 via the reactor L1, the switching element S3 and the switching element S4 back to the first battery B1 is established, as indicated by the current IL1.

In the second step-up circuit BCNV2, the switching elements S2, S3 turn on, with the result that a loop path from the second battery B2 via the reactor L2, the switching element S2 and the switching element S3 back to the second battery B2 is established, as indicated by the current IL2.

As shown in the drawing, the switching element S3 is the common switching element that is supplied with current (IL1 and IL2) from both the first step-up circuit BCNV1 and the second step-up circuit BCNV2.

FIG. 3 shows the operation of the discharge process at the time of parallel step-up operation in the first step-up circuit BCNV1 and the second step-up circuit BCNV2. In the first step-up circuit BCNV1, the switching elements S3, S4 turn off, with the result that the current IL1 flows through a path from the first battery B1 via the reactor L1, the diode Dd2, the diode Dd1 and the load (rotary electric machine 20) back to the first battery B1.

In the second step-up circuit BCNV2, the switching elements S2, S3 turn off, with the result that the current IL2 flows through a path from the second battery B2 via the reactor L2, the diode Dd1, the load (rotary electric machine 20) and the diode Dd4 back to the second battery B2.

The CNV ECU 13 generates and outputs the PWM signals in order to cause the switching elements to perform the operations shown in FIG. 2 and FIG. 3 at the time of parallel step-up operation. Specifically, the CNV ECU 13 generates the PWM signal PWM1 for causing the switching elements S3, S4 to perform a charge (S3 is on, S4 is on) and discharge (S3 is off, S4 is off) of the first step-up circuit BCNV1. The CNV ECU 13 generates the PWM signal PWM2 for causing the switching elements S2, S3 to perform a charge (S2 is on, S3 is on) and discharge (S2 is off, S3 is off) of the second step-up circuit BCNV2.

The PWM signals may be generated and output to the switching element S1 such that the switching element S1 is in the off state (fixed to the off state) over the charge process and the discharge process or the inversion signal (/PWM1 or /PWM2) of the PWM1 or PWM2 may be generated and output to the switching element S1, in order to prevent the switching elements S1 to S4 enter the on state at the same time.

Overheating protection control over the common switching element S3 will be described based on the first and second step-up circuits BCNV1, BCNV2 shown in FIG. 2 and FIG. 3. As described above, the common switching element S3 is supplied with current from the first step-up circuit BCNV1 and the second step-up circuit BCNV2. At this time, as shown in the upper timing chart of FIG. 17, when current of the first step-up circuit BCNV1 and current of the second step-up circuit BCNV2 are superimposed and supplied to the common switching element S3, an overlap loss may arise. As shown in the upper timing chart of FIG. 4, when the on/off timing of the PWM signal PWM1 for the first step-up circuit BCNV1 and the on/off timing of the PWM signal PWM2 for the second step-up circuit BCNV2 deviate from each other, a switching loss may arise.

The common switching element S3 is heated by these losses (power losses). If the loss is excessive, there is a concern about overheating of the common switching element S3. The CNV ECU 13 executes the following overheating protection control when the temperature of the common switching element S3 acquired from the temperature sensor 17 exceeds a predetermined threshold temperature.

In this embodiment, when the sum of the on time of the PWM1 and the on time of the PWM2 per single PWM control period differs from the single PWM control period, the sum of the on time of the PWM1 and the on time of the PWM2 per single PWM control period is brought into coincidence with the single PWM control period by changing the on time of at least one of the PWM1 and the PWM2. In addition, the trailing edge of one of the PWM1 and the PWM2 is connected to the leading edge of the other one of the PWM1 and the PWM2.

The leading edge of each of the PWM1 and the PWM2 means the timing of switching from the off time to the on time. The trailing edge of each of the PWM1 and the PWM2 means the timing of switching from the on time to the off time.

The ratio of the on time to the single PWM control period is referred to as duty ratio or simply referred to as duty. On the assumption that the single PWM control period is fixed, when the above-described on time change control translates, by using the duty ratio, to, when the sum of the duty ratio of the PWM1 and the duty ratio of the PWM2 is different from 100%, bring the sum of the duty ratio of the PWM1 and the duty ratio of the PWM2 100% by changing the on time (on duty) of at least one of the PWM1 and the PWM2. In addition, the trailing edge of one of the PWM1 and the PWM2 is connected to the leading edge of the other one of the PWM1 and the PWM2.

FIG. 4 shows an example of on time change control in the case where the sum of the on time of the PWM1 and the on time of the PWM2 in the single PWM control period is shorter than the single PWM control period, in other words, in the case where the sum of the duty ratio of the PWM1 and the duty ratio of the PWM2 is smaller than 100% (D1+D2<100%). The upper timing chart of FIG. 4 shows the PWM1 and the PWM2 before on time change control.

The lower timing chart of FIG. 4 shows the waveforms at the time when on time change control is executed over the upper waveforms. In this example, the trailing edge of the PWM2 is delayed to the leading edge of the PWM1 (OnDuty2→OnDuty2'), and the trailing edge of the PWM1 is delayed to the leading edge of the PWM2 (OnDuty1→OnDuty1'). In this way, the trailing edge of one of the PWM1 and the PWM2 is connected to the leading edge of the other one of the PWM1 and the PWM2, and the sum of the on time of the PWM1 and the on time of the PWM2 in the single PWM control period coincides with the single PWM control period. In other words, the sum of the duty ratio D1' of the PWM1 and the duty ratio D2' of the PWM2 after on time change control becomes 100%.

After on time change control, the common switching element S3 is constantly in the on state over the single PWM control period, so the switching loss becomes zero. In addition to this, current of the first step-up circuit BCNV1 and current of the second step-up circuit BCNV2 are alternately supplied to the common switching element S3 without any overlap. As a result, as is apparent from comparison between the upper timing chart and lower timing chart of FIG. 4, the switching loss becomes zero.

Figure 5:
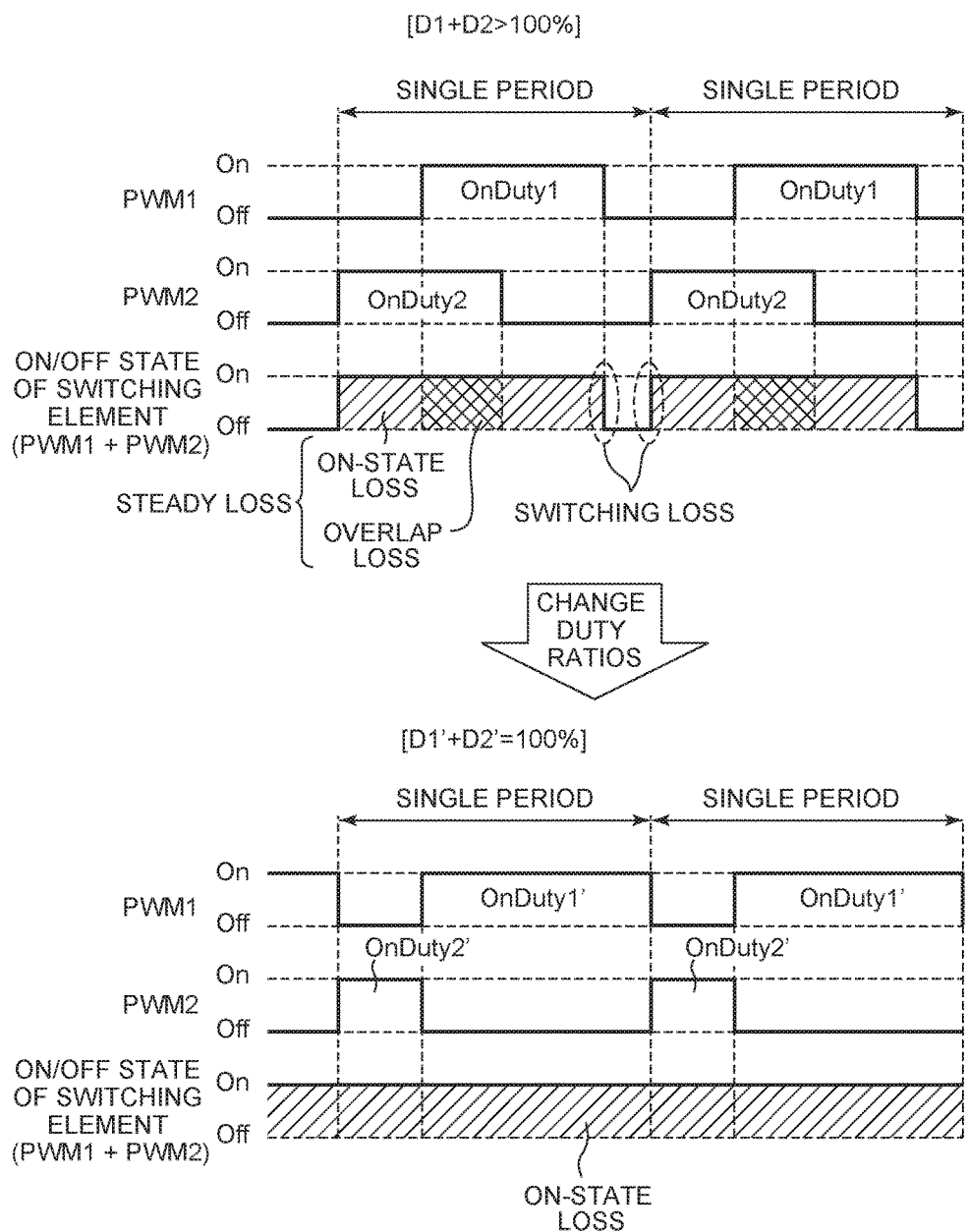
FIG. 5 is a view that illustrates a second example of on time change control according to the embodiment.

FIG. 5 shows an example of on time change control in the case where the sum of the on time of the PWM1 and the on time of the PWM2 in the single PWM control period exceeds the single PWM control period, in other words, in the case where the sum of the duty ratio of the PWM1 and the duty ratio of the PWM2 exceeds 100% (D1+D2>100%). The upper timing chart of FIG. 5 shows the PWM1 and the PWM2 before on time change control.

The lower timing chart of FIG. 5 shows the waveforms at the time when on time change control is executed over the upper waveforms. In this example, the trailing edge of the PWM2 is advanced (moved forward) to the leading edge of the PWM1 (OnDuty2→OnDuty2'), and the trailing edge of the PWM1 is delayed to the leading edge of the PWM2 (OnDuty1→OnDuty1'). In this way, the trailing edge of one of the PWM1 and the PWM2 is connected to the leading edge of the other one of the PWM1 and the PWM2, and the sum of the on time of the PWM1 and the on time of the PWM2 in the single PWM control period coincides with the single PWM control period. By executing on time change control, the overlap loss and the switching loss become zero as shown in the lower timing chart of FIG. 5.

In the on time change control described above, the trailing edge of each of the PWM1 and the PWM2 is aligned with the leading edge of the other one of the PWM1 and the PWM2; however, the disclosure is not limited to this mode. For example, as shown in FIG. 6, the on time change control is executed over the PWM1 and the PWM2 such that the leading edge of each of the PWM1 and the PWM2 is aligned with the trailing edge of the other one of the PWM1 and the PWM2. With this example as well, as shown in the lower timing chart of FIG. 6, the trailing edge of one of the PWM1 and the PWM2 is connected to the leading edge of the other one of the PWM1 and the PWM2, and the sum of the on time of the PWM1 and the on time of the PWM2 in the single PWM control period coincides with the single PWM control period. In this timing chart, both the on time of the PWM1 and the on time of the PWM2 are changed; however, depending on waveforms, only the on time of one of the PWM1 and the PWM2 may be changed.

In FIG. 4 to FIG. 6, the process of shortening or extending the on time and the process of connecting the trailing edge and the leading edge to each other are performed at the same time; however, the system is not limited to this mode. For example, each of the processes may be performed step by step.

Figure 7:
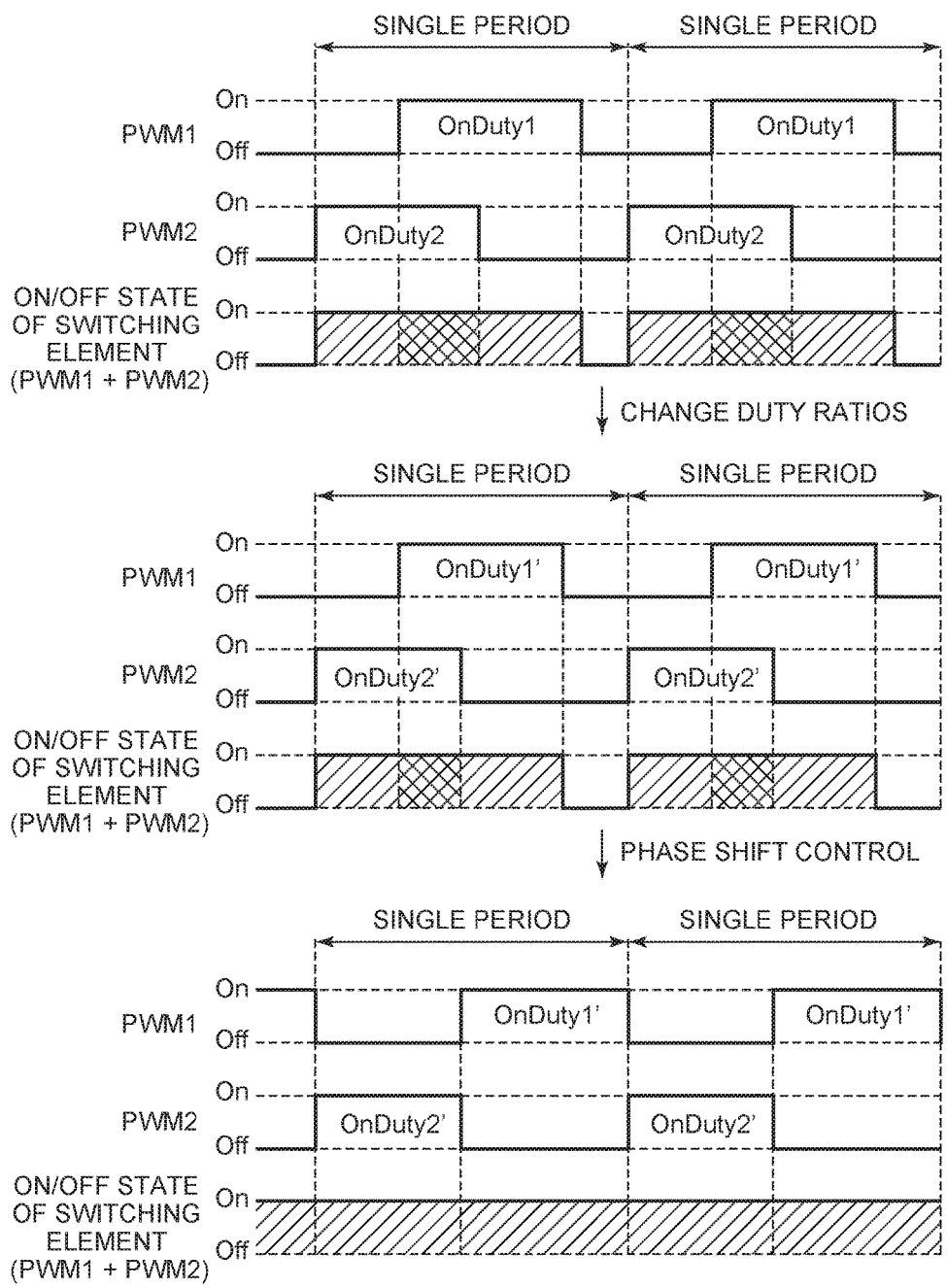
FIG. 7 is a view that illustrates a fourth example of on time change control according to the embodiment.

FIG. 7 shows an example in which the on time is shortened or extended and then phase shift control is executed. In order to distinguish the on time change control in the present application from the phase shift control in the existing technique, hereinafter, the phase shift control is defined as control for shifting (connecting) the leading edge of at least one of the PWM1 and the PWM2 to the trailing edge of the other one of the PWM1 and the PWM2 without shortening or extending the on time.

Initially, as shown in the middle timing chart of FIG. 7, the sum of the on time of the PWM1 and the on time of the PWM2 in the single PWM control period is brought into coincidence with the single PWM control period (OnDuty1→OnDuty1', OnDuty2→OnDuty2'). At this time, the rate of change (the rate of reduction in FIG. 7) in the PWM1 and the rate of change (the rate of reduction in FIG. 7) in the PWM2 may be equal to each other.

Subsequently, as shown in the lower timing chart of FIG. 7, phase shift control is executed in order to connect the trailing edge of one of the PWM1 and the PWM2 to the leading edge of the other one of the PWM1 and the PWM2. Through the above-described two processes, the trailing edge of one of the PWM1 and the PWM2 is connected to the leading edge of the other one of the PWM1 and the PWM2, and the sum of the on time of the PWM1 and the on time of the PWM2 in the single PWM control period coincides with the single PWM control period.

In the example of FIG. 7, as compared to FIG. 4 to FIG. 6, the rate of change in the PWM1 and the rate of change in the PWM2 are made equal to each other, so the example of FIG. 7 has the advantage of not significantly changing the balance between electric power supplied from the first battery B1 and electric power supplied from the second battery B2 before and after on time change control.

In the examples shown in FIG. 4 to FIG. 7, on time change control is executed such that the sum of the on time of the PWM1 and the on time of the PWM2 coincides with the single PWM control period; however, the system is not limited to this mode. In short, the power loss of the common switching element S3 after on time change control just needs to be smaller than the power loss before on time change control, so, for example, the sum of the on time of the PWM1 and the on time of the PWM2 may slightly exceed the single PWM control period. In other words, the on time of at least one of the PWM1 and the PWM2 is changed such that the sum of the on time of the PWM1 and the on time of the PWM2 falls within the range from the single PWM control period to the allowable period obtained by adding the predetermined time to the single PWM control period.

The on time change control will be described by using the duty ratio. The duty ratios D1', D2' are set such that the sum of the duty ratio D1' of the PWM1 and the duty ratio D2' of the PWM2 after on time change control is larger than or equal to 100%, that is, 100%+α((100+α)%≥D1'+D2'≥100%). α is any positive number.

FIG. 8 shows an example in which on time change control is executed over such waveforms that the sum of the on time of the PWM1 and the on time of the PWM2 is shorter than the single PWM control period (D1+D2<100%) and is executed such that the sum of the on time of the PWM1 and the on time of the PWM2 exceeds the single PWM control period. In this example, the on time of the PWM1 and the on time of the PWM2 are changed such that the trailing edge of the PWM1 is delayed and connected to the leading edge of the PWM2 and the trailing edge of the PWM2 is delayed to timing slightly (temporally) after the leading edge of the PWM1.

When the sum of the on time of the PWM1 and the on time of the PWM2 is longer than or equal to the single PWM control period, the switching loss becomes zero in theory. For example, when the switching loss occupies the majority of the power loss that arises in the common switching element S3, it is possible to effectively reduce the power loss by executing the above-described on time change control.

In this example, as a result of the on time change control, the on-state loss increases, and a new overlap loss arises. Therefore, a power loss before on time change control and a power loss after on time change control may be predicted, and then the waveforms that cause a smaller one of the power losses may be used. That is, when the power loss that arises in the common switching element S3 based on the PWM1 and the PWM2 after on time change control is smaller than the power loss that arises in the common switching element S3 based on the PWM1 and the PWM2 before on time change control, the on time change control may be allowed to be executed.

Figure 9:
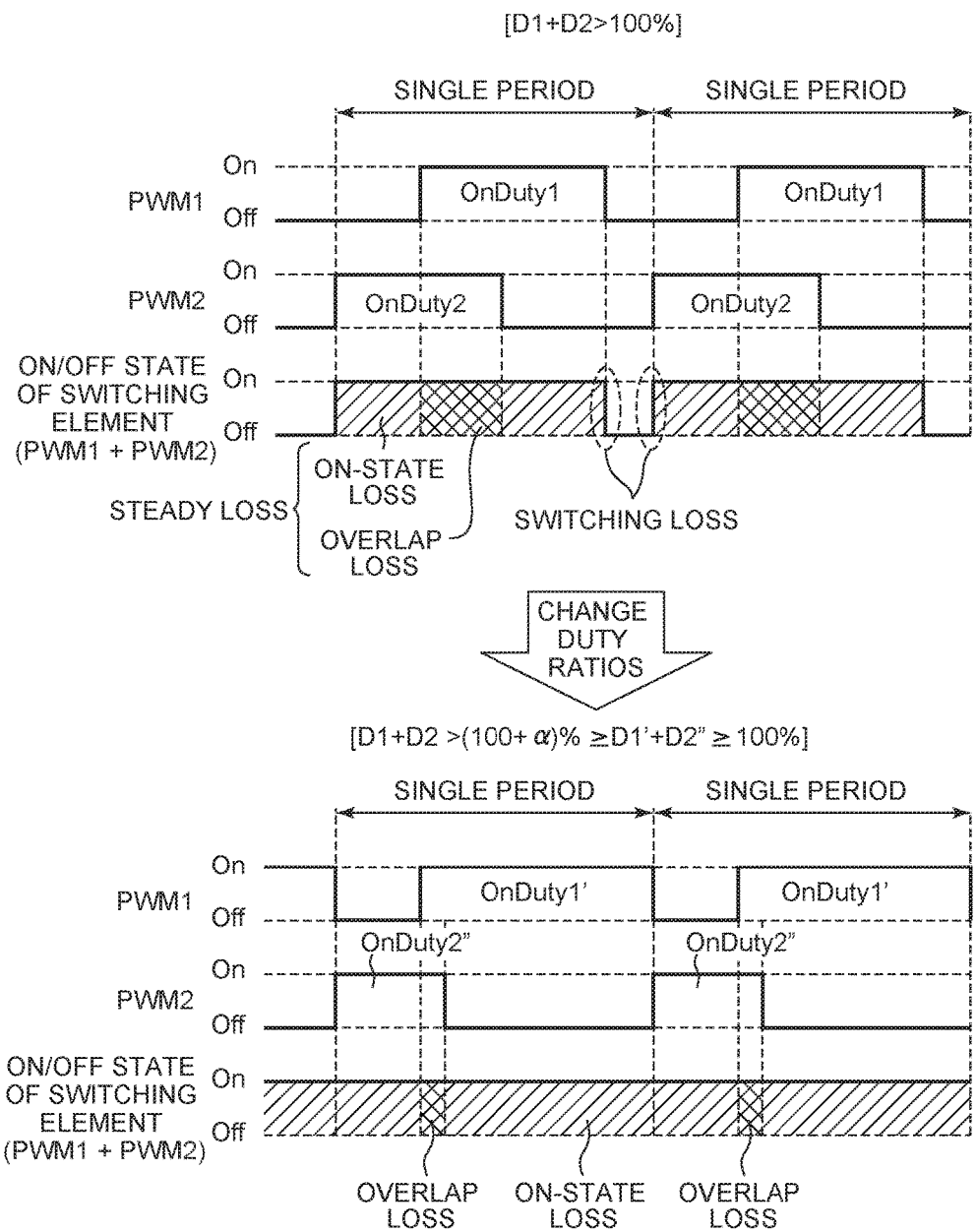
FIG. 9 is a view that illustrates a sixth example of on time change control according to the embodiment.

FIG. 9 shows an example in which, for such waveforms that the sum of the on time of the PWM1 and the on time of the PWM2 exceeds the single PWM control period (D1+D2>100%), the on time of the PWM1 and the on time of the PWM2 are changed such that the sum of the on time of the PWM1 and the on time of the PWM2 falls within the range from the single PWM control period to the allowable period. In this example, the on time of the PWM1 and the on time of the PWM2 are changed such that the trailing edge of the PWM1 is delayed and connected to the leading edge of the PWM2 and the trailing edge of the PWM2 is advanced to timing slightly (temporally) after the leading edge of the PWM1.

Through the on time change control, the switching loss becomes zero in theory, and the overlap loss is also reduced. In executing such on time change control, the allowable period should be set so as to be longer than or equal to the single PWM control period and shorter than the sum of the on time of the PWM1 and the on time of the PWM2 before on time change control. In other words, on time change control should be executed such that the difference between the sum of the on time of the PWM1 and the on time of the PWM2 and the single PWM control period is shorter than the difference before on time change control.

In any of the above-described embodiments of on time change control, on time change control over the PWM1 and the PWM2 is not limited to the modes shown in the timing charts. For example, depending on waveforms, any mode, such as a delay or advance of the on time of only the PWM1, a delay or advance of the on time of only the PWM2, an advance of the on time of each of the PWM1 and the PWM2, a delay of the on time of each of the PWM1 and the PWM2, and a delay of the on time of one of the PWM1 and the PWM2 and an advance of the on time of the other one of the PWM1 and the PWM2, may be applied.

As described above, depending on the waveforms of the PWM1 and PWM2, the period of the on-state loss extends for a reduction in the switching loss to zero as a result of on time change control. In some cases, a new overlap loss arises. Therefore, when the amount of increase in the on-state loss or the overlap loss is larger than the amount of reduction in the switching loss, there is a concern that on time change control contrarily increases the loss in the common switching element S3.

Therefore, the CNV ECU 13 may calculate losses in the common switching element S3 before and after on time change control in advance and then control the on/off state of the common switching element S3 based on the PWM signals that cause a smaller loss.

FIG. 10 and FIG. 11 show an example of estimating a loss in the common switching element S3. In this example, on the assumption of the example of FIG. 7, that is, the example in which the process of shortening or extending the on time and the phase shift process are executed step by step and the embodiment in which the sum of the on time of the PWM1 and the on time of the PWM2 after change is brought into coincidence with the single PWM control period, the loss in the common switching element S3 is estimated.

In this estimation, the voltage VB1 of the first battery B1 is set to 300 [V], and the voltage VB2 of the second battery B2 is set to 200 [V]. In addition, the switching frequency (carrier frequency) fsw is set to 10 [kHz], and the on voltage Vice (collector-to-emitter saturation voltage) of the common switching element S3 is set to 2 [V]. Furthermore, the turn-on time Ton of the common switching element S3 is set to 110 [ns], and the turn-off time Toff of the common switching element S3 is set to 170 [ns].

Initially, the duty ratio D1 [rate] of the PWM1 is shown at the left end of the table of FIG. 10. In this table, the minimum value of D1 is set to 5%, and the duty ratio (the ratio of on duty) is increased in units of 5% below.

The duty ratio D2 of the PWM2 and the stepped-up voltage VH are calculated by using the duty ratio D1 and the battery voltages VB1, VB2. The operation mode of the voltage converter 11 in the present embodiment assumes the parallel step-up mode, so the stepped-up voltage of the first step-up circuit BCNV1 and the stepped-up voltage of the second step-up circuit BCNV2 are equal to each other in theory. In consideration of this precondition, simultaneous equations of the following mathematical expressions (1) and (2) are obtained.

$$\begin{cases} D1 = (VH - VB1)/VH & (1) \\ D2 = (VH - VB2)/VH & (2) \end{cases}$$

By solving the mathematical expressions (1) and (2), as shown in the table of FIG. 10, the duty ratio D2 and the stepped-up voltage VH for any duty ratio D1 are obtained. In the above-described mathematical expressions (1) and (2) and the mathematical expressions (3) to (7), each of the duty ratios D1, D2 indicates not a percentage but an absolute value (for example, 100%→1.00).

The sum D1+D2 [rate] of the duty ratios D1, D2 is shown on the right side of the columns of the duty ratios D1, D2. A cell in which the value of D1+D2 is 100% is shown near the middle of the table.

In addition, the current IL1 [A] that is supplied from the first step-up circuit BCNV1 to the common switching element S3 is obtained based on the voltage VB1 of the first battery B1 and the output electric power Wout [W]. Similarly, the current IL2 [A] that is supplied from the second step-up circuit BCNV2 to the common switching element S3 is obtained based on the voltage VB2 of the second battery B2 and the output electric power Wout [W]. In the example of FIG. 10, the output electric power Wout is set to 50 [kW].

By using the thus obtained D1, D2, VH, IL1 and IL2, the power losses [mJ] in the common switching element S3 as shown at the right side of the sheet in FIG. 10 are obtained. The power losses, that is, a turn-on loss Eon [mJ], a turn-off loss Eoff [mJ] and a steady loss (which indicates an on-state loss) Esat [mJ], are obtained for each of the PWM1 and the PWM2. That is, six losses in total, that is, Eon1 and Eon2 as the turn-on loss, Eoff1 and Eoff2 as the turn-off loss and Esat1 and Esat2 as the steady loss, are obtained.

The turn-on losses, the turn-off losses and the steady losses are respectively allowed to be obtained from the following mathematical expressions (3), (4), and (5).

$$Eon_k = \frac{1}{2} \times VH \times IL_k \times Ton \quad (3)$$

$$Eoff_k = \frac{1}{2} \times VH \times IL_k \times Toff \quad (4)$$

$$Esat_k = Vce \times IL_K \times \frac{D_k}{fsw} \quad (5)$$

where k=1 or 2

As for the loss obtained as described above, the total Etotal [mJ] of the six losses obtained in FIG. 10 is shown in the fourth column from the left side of the sheet of FIG. 11 via the arrow. In addition, in the columns to the right side of the above column, the total Etotal' of the losses at the time when phase shift control is executed and the difference delta [mJ] between Etotal' and Etotal are shown.

In the example shown in FIG. 11, in calculating the loss Etotal' at the time of execution of phase shift control, a calculation method is changed between when D1+D2<100% and when D1+D2≥100%.

That is, when D1+D2<100%, on the assumption of control for connecting the trailing edge of the PWM2 to the leading edge of the PWM1, Etotal' is obtained by subtracting the turn-on loss Eon1 of the PWM1(D1) and the turn-off loss Eoff2 of the PWM2(D2) from the total loss Etotal before phase shift control.

When D1+D2≥100%, the entire switching loss disappears as a result of phase shift control, so Etotal' is obtained by subtracting Eon1, Eon2, Eoff1 and Eoff2 from the total loss Etotal before the phase shift control.

As is apparent when the total loss Etotal before phase shift control and the total loss Etotal' after phase shift control are compared with each other, that is, when delta next on the right side of the Etotal' on the sheet of FIG. 11 is referenced, the loss is reduced through phase shift control in any of the duty ratios D1, D2 (in any of the rows).

The columns further next on the right side of FIG. 11 show the total loss Etotal" [mJ] in the common switching element S3 and the difference delta [mJ] between the total loss Etotal" and the total loss Etotal' at the time of phase shift control in the case where on time change control is executed after phase shift control.

In this column, the total loss Etotal' (=43.3 [mJ]) after phase shift control at the time when the sum of the duty ratios D1 and D2 is 100% is applied to all the cells in the column as the total loss Etotal" after on time change control.

As is apparent when the difference delta next on the right side of the total loss Etotal" after on time change control is referenced, the loss is reduced for all the cells in the column in the region in which the sum of the duty ratios D1 and D2 exceeds 100%. On the other hand, in the region in which the sum of the duty ratios D1 and D2 is smaller than 100%, there are a case where the total loss increases and a case where the total loss is reduced.

In consideration of the above-described calculation results, the CNV ECU 13 may determine whether on time change control is allowed to be executed based on comparison between the loss in the common switching element S3 before on time change control and the loss in the common switching element S3 after on time change control.

Figure 12:
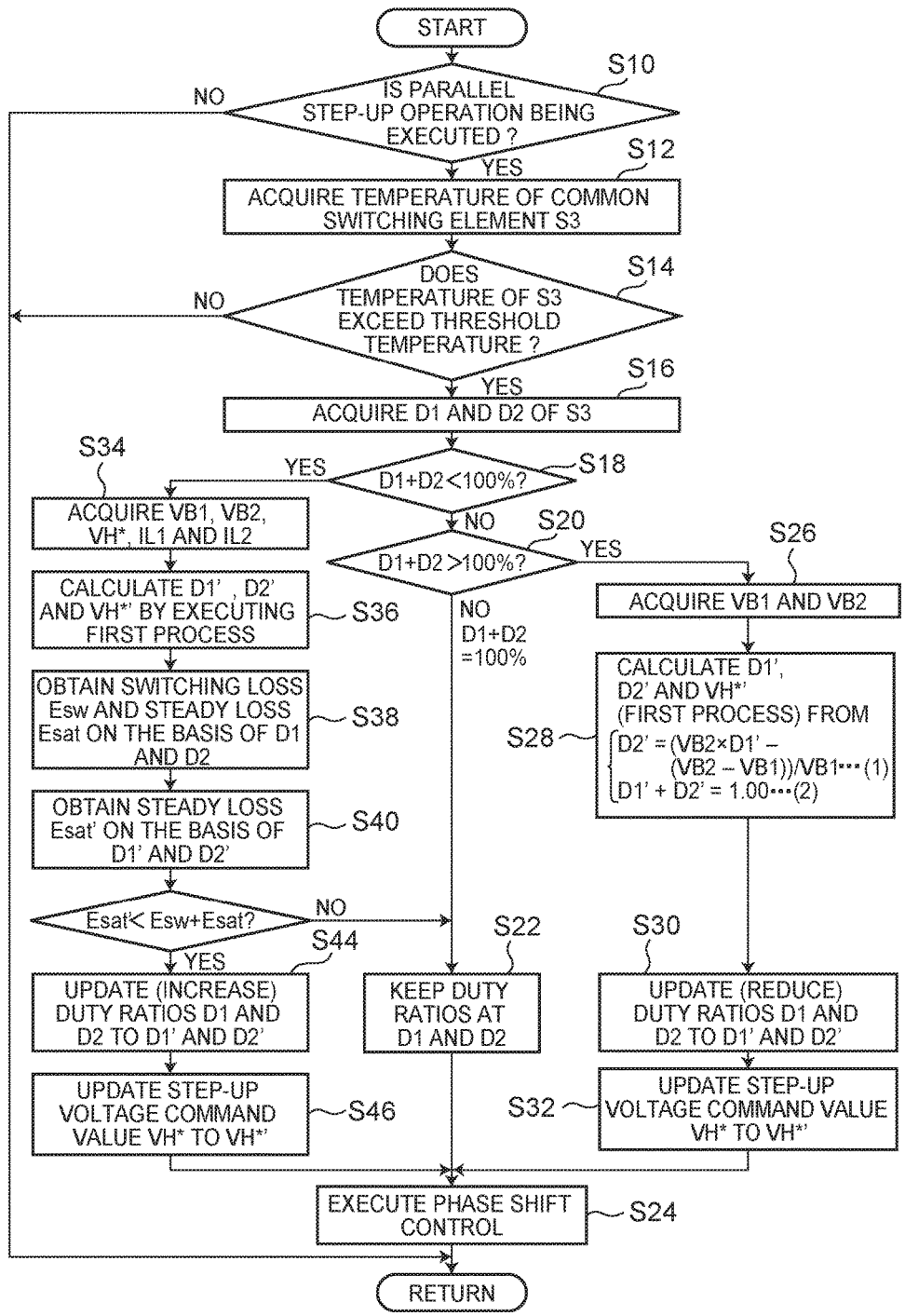
FIG. 12 is a view that illustrates a flowchart of overheating protection control (on time change control and phase shift control) over the common switching element in the electric power conversion system according to the embodiment.

FIG. 12 illustrates a flowchart of overheating protection control over the common switching element S3, which is executed by the CNV ECU 13, in consideration of the above-described calculation results. This control flowchart is based on the embodiment shown in FIG. 7. That is, FIG. 12 shows the control flowchart in the case where the process of shortening or extending the on time and the phase shift process are executed step by step and on time change control that brings the sum of the on time of the PWM1 and the on time of the PWM2 into coincidence with the single PWM control period is executed.

The CNV ECU 13 initially determines whether the voltage converter 11 is executing the parallel step-up operation (S10). When the parallel step-up operation is not being executed, the process proceeds to Return at the end of the flowchart.

When the parallel step-up operation is being executed, the CNV ECU 13 acquires the temperature of the common switching element S3 from the temperature sensor 17 (S12), and determines whether the acquired temperature exceeds the predetermined threshold temperature (S14). When the temperature of the common switching element S3 does not exceed the predetermined threshold temperature, the process proceeds to Return at the end of the flowchart.

When the temperature of the common switching element S3 exceeds the threshold temperature, the CNV ECU 13 acquires the duty ratio D1 of the PWM1 and the duty ratio D2 of the PWM2 (S16), and determines whether the value of D1+D2 is smaller than 100% (S18).

When the value of D1+D2 is not smaller than 100%, that is, when the value of D1+D2 is larger than or equal to 100%, the CNV ECU 13 determines whether the value of D1+D2 exceeds 100% (S20).

When the value of D1+D2 does not exceed 100% in step S20, the value of D1+D2 is equal to 100% (D1+D2=100%). The CNV ECU 13 keeps the duty ratios at D1 and D2 (S22), and executes phase shift control (S24).

When it is determined in step S20 that the value of D1+D2 exceeds 100%, the CNV ECU 13 acquires the voltage VB1 of the first battery B1 and the voltage VB2 of the second battery B2 (S26). In addition, the CNV ECU 13 calculates the duty ratios D1' and D2' after on time change control (D1'+D2'=100%).

In calculating the duty ratios D1' and D2', the CNV ECU 13 solves the simultaneous equations of the following mathematical expression (6), from which VH is removed from the above-described mathematical expressions (1) and (2), and the mathematical expression (7) for the duty ratios D1' and D2' (S28).

$$\begin{cases} D2' = ((VB2 \times D1') - (VB2 - VB1))/VB1 & (6) \\ D1' + D2' = 1.00 & (7) \end{cases}$$

Furthermore, the CNV ECU 13 calculates a step-up voltage command value VH*' after on time change control based on the obtained duty ratio D1' and the first battery voltage VB1 or the obtained duty ratio D2' and the second battery voltage VB2.

Calculation of the duty ratios D1', D2' by using the mathematical expressions (6) and (7) and calculation of the step-up voltage command value VH*' after on time change control are hereinafter referred to as first process.

The CNV ECU 13 updates (reduces) the duty ratio from D1 to D1' and the duty ratio from D2 to D2' (S30), and updates the step-up voltage command value from VH* to VH*' (S32). In addition, the CNV ECU 13 executes phase shift control over the updated duty ratios D1', D2' (S24).

Back to step S18, when the sum of the duty ratios D1, D2 is smaller than 100%, the CNV ECU 13 compares the total loss in the common switching element S3 before on time change control with the total loss in the common switching element S3 after on time change control, and then uses the duty ratio, which causes a lower total loss, in controlling the on/off state of the common switching element S3.

The CNV ECU 13 acquires the voltage VB1 of the first battery B1 from the battery voltage sensor 46A and the voltage VB2 of the second battery B2 from the battery voltage sensor 46B. The CNV ECU 13 also acquires the current IL1 of the first battery B1 from the battery current sensor 48A and the current IL2 of the second battery B2 from the battery current sensor 48B. The potential difference VH (output voltage) between the high-voltage line 26 and the reference line 28 is acquired from the output voltage sensor 50 (S34).

Subsequently, the CNV ECU 13 calculates the duty ratios D1', D2' after on time change control and the step-up voltage command value VH*' by executing the above-described first process (S36). The CNV ECU 13 obtains a switching loss Esw and a steady loss Esat that arise in the common switching element S3 in the case where phase shift control is executed over the duty ratios D1, D2 before on time change control (S38). It is noted that Esw=Eon+Eoff As for the switching loss Esw, in consideration of the amount of decrease in loss resulting from phase shift control, the turn-on loss Eon1 of the PWM1(D1) and the turn-off loss Eoff2 of the PWM2 do not need to be incorporated, as in the case of FIG. 11 described above. That is, the sum of the turn-off loss Eoff1 of the PWM1(D1) and the turn-on loss Eon2 of the PWM2 may be regarded as the switching loss Esw.

The CNV ECU 13 obtains a steady loss Esat' that arises in the common switching element S3 after on time change control and phase shift control based on the duty ratios D1', D2' after on time change control (S40).

Subsequently, the CNV ECU 13 obtains the total Esw+Esat of the switching loss and steady loss based on the switching loss Esw and steady loss Esat obtained in step S38. The total Esw+Esat of the switching loss and steady loss arise at the time of controlling the on/off state of the common switching element S3 based on the PWM1 and the PWM2 before on time change control and after phase shift control. The CNV ECU 13 determines whether the loss Esw+Esat before on time change control and after phase shift control exceeds the steady loss Esat' after on time change control and after phase shift control (S42).

When the loss Esw+Esat before on time change control and after phase shift control does not exceed the loss Esat' after on time change control and after phase shift control, the loss in the common switching element S3 is low when no on time change control is executed, so the CNV ECU 13 keeps the duty ratios at D1 and D2 (S22), and executes phase shift control (S24).

When the loss Esw+Esat before on time change control and after phase shift control exceeds the loss Esat' after on time change control and after phase shift control, the CNV ECU 13 updates (increases) the duty ratio from D1 to D1' and the duty ratio from D2 to D2' (S44), and updates the step-up voltage command value from VH* to VH*' (S46). The CNV ECU 13 executes phase shift control over the updated duty ratios D1', D2' (S24). The on/off state of the common switching element S3 is controlled based on the logical addition of D1' and D2' after phase shift control.

Figure 13:
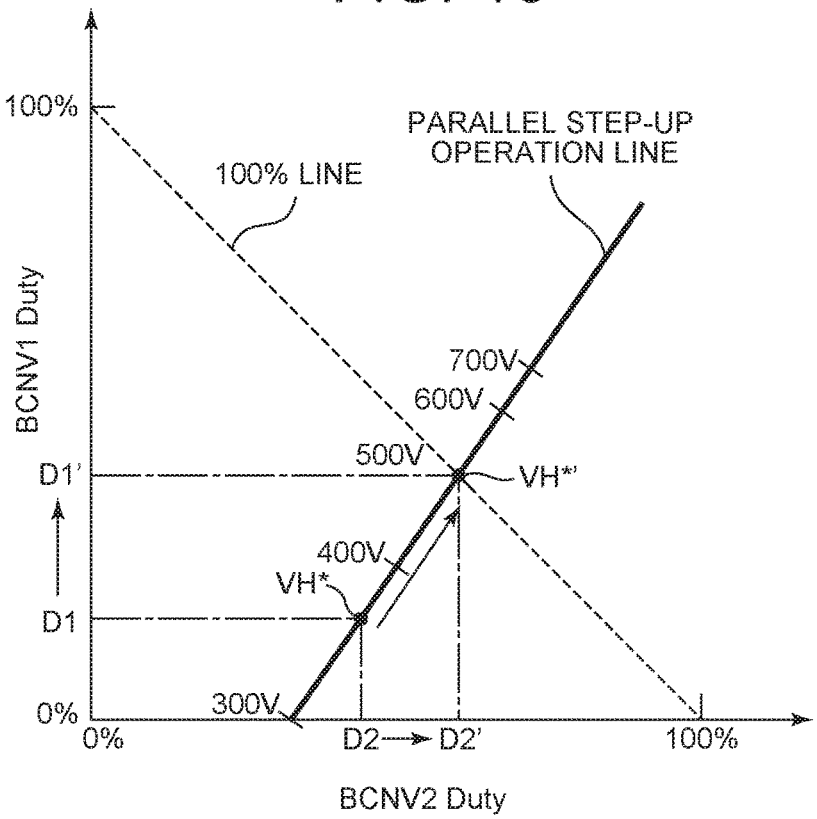
FIG. 13 is a graph that shows the relationship between a step-up voltage command value and each of the duty ratio of a PWM signal PWM1 and the duty ratio of a PWM signal PWM2 at the time of parallel step-up operation.

As shown in step S32 and step S46 in FIG. 12, as the on times (duty ratios) are changed, the step-up voltage command value is changed (VH*→VH*'). FIG. 13 shows a view that illustrates these changes. The ordinate axis represents the duty ratio of the PWM signal PWM1 for the first step-up circuit BCNV1, and the abscissa axis represents the duty ratio of the PWM signal PWM2 for the second step-up circuit BCNV2.

In this graph, the upward-sloping line (parallel step-up operation line) shows the step-up voltage command value VH at the time of parallel step-up operation. That is, when a selected point is plotted on the parallel step-up operation line and then a perpendicular is drawn from the plot to the abscissa axis, the intersection of the perpendicular with the abscissa axis is the duty ratio of the second step-up circuit BCNV2. Similarly, when a perpendicular is drawn from the plot on the parallel step-up operation line to the ordinate axis, the intersection of the perpendicular with the ordinate axis is the duty ratio of the first step-up circuit BCNV1.

The downward-sloping dashed line in FIG. 13 indicates a line (100% line) on which the sum of the duty ratio D1 of the first step-up circuit BCNV1 and the duty ratio D2 of the second step-up circuit BCNV2 is 100%. As a result of on time change control, the step-up voltage command value VH* takes the value VH*' at the intersection of the parallel step-up operation line with the 100% line. The duty ratio D1 of the first step-up circuit BCNV1 and the duty ratio D2 of the second step-up circuit BCNV2 both are changed to the values D1', D2' corresponding to the intersection VH*' of the parallel step-up operation line with the 100% line.

Figure 14:
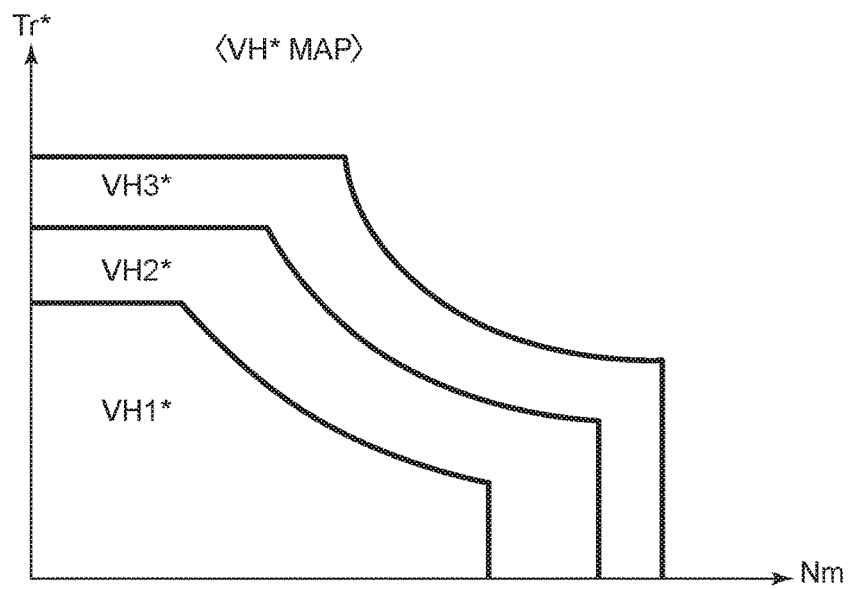
FIG. 14 is a view that illustrates a VH* map for obtaining a step-up voltage command value VH* intended for the voltage converter.

The step-up voltage command value VH* before change may be obtained by using the VH* map shown in FIG. 14. The VH* map is a map for obtaining the step-up voltage command value VH* for the voltage converter 11. The step-up voltage command value VH* (VH*1, VH*2, VH*3, or the like) is stored in correspondence with an actual rotation speed (abscissa axis) of the rotary electric machine 20 and a torque command value (ordinate axis). The step-up voltage command value VH* is obtained by substituting the torque command value based on the depression amount of the accelerator pedal (not shown) and the actual rotation speed of the rotary electric machine 20, acquired from the rotation speed sensor 52, into the VH* map.

When the step-up voltage command value VH* obtained based on the torque command value and the actual rotation speed of the rotary electric machine 20 is changed to VH*' through on time change control, there is a concern that a desired torque or rotation speed is not obtained.

Therefore, even when the step-up voltage command value is changed through on time change control, compensation control (current compensation) for obtaining a desired torque and rotation speed from the rotary electric machine 20 may be executed. For example, the current compensation is executed by the cooperation of the CNV ECU 13 and the INV ECU 15.

When on time change control is executed by the CNV ECU 13 and, as a result, the step-up voltage command value is changed from VH* to VH*', information about the change is transmitted from the CNV ECU 13 to the INV ECU 15. The INV ECU 15 sets the conduction ratio (that is, duty ratio) of current in the inverter 18 based on the changed step-up voltage command value VH*' and a predetermined electric power command value.

More specifically, the electric power command value is transmitted from the ECU 22 to the INV ECU 15 in advance. The electric power command value is a required electric power value from the load (rotary electric machine 20) to which alternating-current power converted by the inverter 18 from direct-current power is supplied. The electric power command value is, for example, obtained by multiplying the step-up voltage command value VH*, obtained from the VH* map, by a predetermined proportional control gain or an integral control gain.

As information about the change in the step-up voltage command value (VH*→VH*') is received from the CNV ECU 13, the INV ECU 15 obtains a current value based on the changed step-up voltage command value VH*' and the electric power command value, and then controls the on/off states of the switching elements in the inverter 18 based on the duty ratio corresponding to the current value.

The above-described VH* map may be created based on so-called maximum torque control for maximizing the efficiency of the rotary electric machine 20. That is, as the step-up voltage command values VH* (VH*1, VH*2, VH*3, and the like) plotted on the VH* map, voltage values corresponding to the optimal operating points of the rotary electric machine 20 (maximum efficiency voltage values) may be stored.

If the step-up voltage command value is changed from the maximum efficiency voltage value VH* to VH*' as a result of the above-described on time change control, there is a concern that, even when the amount of change (VH*→VH*') in the voltage value is compensated by current with the use of the inverter 18, the efficiency of the rotary electric machine 20 decreases and, as a result, a desired rotation speed or torque is not obtained.

The INV ECU 15 may determine the conduction ratio (duty ratio) in the inverter 18 such that the amount of decrease in the efficiency of the rotary electric machine 20 resulting from the change in the step-up voltage command value is compensated in addition to the change in the step-up voltage command value or solely. For example, the INV ECU 15 may determine the duty ratio of the switching elements in the inverter 18 based on a value obtained by multiplying a current value, which is used to compensate the difference (VH*−VH*') between the voltage value VH* before the change in the step-up voltage command value and the voltage value VH*' after the change in the step-up voltage command value, by a coefficient (loss compensation coefficient) proportional to the difference.

In the above-described embodiment, a so-called series-parallel converter that includes four switching elements and that is able to switch between series connection and parallel connection is provided as the voltage converter 11; however, the system is not limited to this mode. In short, as long as a voltage converter is able to perform parallel step-up operation and includes a common switching element to which current is commonly supplied from two step-up circuits, overheating protection control according to the present embodiment is applicable to the voltage converter.

Figure 15:
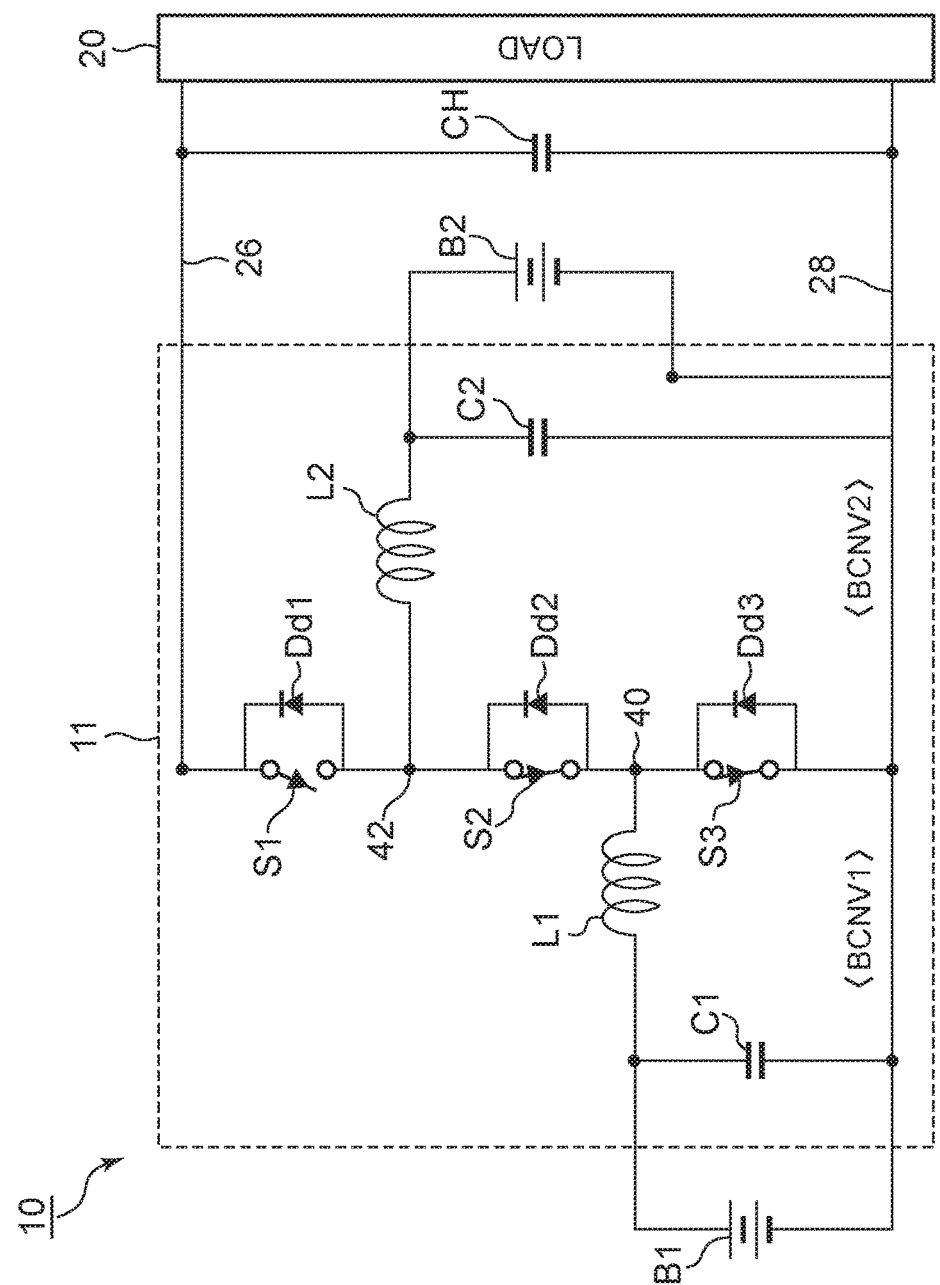
FIG. 15 is a view that shows another example of the voltage converter according to the embodiment.

FIG. 15 shows another example of the voltage converter 11. In this voltage converter 11, the three switching elements S1, S2, S3 are connected in series in the direction from the high-voltage line 26 toward the reference line 28 as the forward direction. In addition, the diodes Dd1 to Dd3 are respectively connected in antiparallel with the switching elements S1 to S3.

The first battery B1 is connected between the connection point 40 and the reference line 28. The connection point 40 is provided between the second switching element S2 and the third switching element S3 from the high-voltage line 26 side. In addition, the first reactor L1 is provided in series with the first battery B1, and the first capacitor C1 is provided in parallel with the first battery B1.

The second battery B2 is connected between the connection point 42 and the reference line 28. The connection point 42 is provided between the first switching element S1 and the second switching element S2 from the high-voltage line 26 side. In addition, the second reactor L2 is provided in series with the second battery B2, and the second capacitor C2 is provided in parallel with the second battery B2.

The first step-up circuit BCNV1 and the second step-up circuit BCNV2 are provided at the time of parallel step-up operation. In the first step-up circuit BCNV1, the voltage of the first battery B1 is stepped up by the voltage converter 11, and the stepped-up voltage is output to the high-voltage line 26 (output line). In the second step-up circuit BCNV2, the voltage of the second battery B2 is stepped up by the voltage converter 11, and the stepped-up voltage is output to the high-voltage line 26 (output line).

The switching element S3 establishes or opens the loop path (the loop including the first battery B1 and the first reactor L1) of the first step-up circuit BCNV1. The switching elements S2, S3 establish or open the loop path (the loop including the second battery B2 and the second reactor L2) of the second step-up circuit BCNV2. From the configurations of both step-up circuits, the common switching element is the switching element S3.

When the loop path is established or opened based on the PWM signal from the CNV ECU 13, the on/off operation of the switching element S3 is controlled by using the PWM1 for the first step-up circuit BCNV1. The on/off operation of each of the switching elements S2, S3 is controlled by using the PWM2 for the second step-up circuit BCNV2.

The CNV ECU 13 monitors the temperature of the common switching element S3. When the temperature exceeds the threshold temperature, the CNV ECU 13 executes the above-described overheating protection control via phase shift control and on time change control over the PWM1 and the PWM2.

Figure 16:
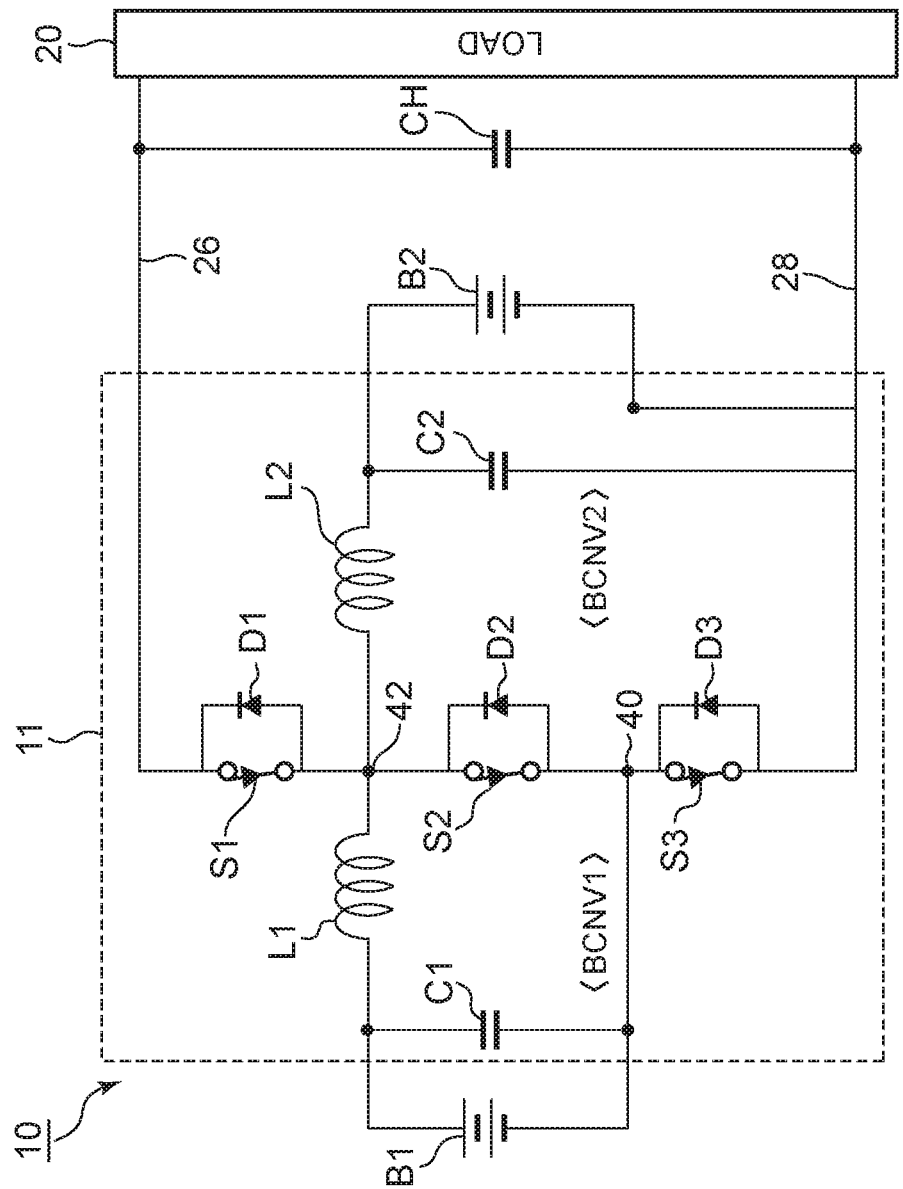
FIG. 16 is a view that shows further another example of the voltage converter according to the embodiment.

FIG. 16 shows further another example of the voltage converter 11. As in the case of FIG. 15, in the voltage converter 11, the three switching elements S1, S2, S3 are connected in series in the direction from the high-voltage line 26 toward the reference line 28 as the forward direction. In addition, the diodes Dd1 to Dd3 are respectively connected in antiparallel with the switching elements S1 to S3.

The voltage converter 11 shown in FIG. 16 differs from the voltage converter shown in FIG. 15 in the arrangement of the first step-up circuit BCNV1. That is, the first battery B1, the first reactor L1 and the first capacitor C1 are connected between the connection point 42 and the connection point 40. The connection point 42 is provided between the first switching element S1 and the second switching element S2 from the high-voltage line 26 side. The connection point 40 is provided between the second switching element S2 and the third switching element S3 from the high-voltage line 26 side.

The first step-up circuit BCNV1 and the second step-up circuit BCNV2 are provided at the time of parallel step-up operation. In the first step-up circuit BCNV1, the voltage of the first battery B1 is stepped up by the voltage converter 11, and the stepped-up voltage is output to the high-voltage line 26 (output line). In the second step-up circuit BCNV2, the voltage of the second battery B2 is stepped up by the voltage converter 11, and the stepped-up voltage is output to the high-voltage line 26 (output line).

The switching element S2 establishes or opens the loop path (the loop including the first battery B1 and the first reactor L1) of the first step-up circuit BCNV1. The switching elements S2, S3 establish or open the loop path (the loop including the second battery B2 and the second reactor L2) of the second step-up circuit BCNV2. From the configurations of both step-up circuits, the common switching element is the switching element S2.

When the loop path is established or opened based on the PWM signal from the CNV ECU 13, the on/off operation of the switching element S2 is controlled by using the PWM1 for the first step-up circuit BCNV1. The on/off operation of each of the switching elements S2, S3 is controlled by using the PWM2 for the second step-up circuit BCNV2.

The CNV ECU 13 monitors the temperature of the common switching element S2. When the temperature exceeds the threshold temperature, the CNV ECU 13 executes the above-described overheating protection control via phase shift control and on time change control over the PWM1 and the PWM2.

The embodiment according to the disclosure will be summarized below. The electric power conversion system 10 establishes the first step-up circuit BCNV1 and the second step-up circuit BCNV2 at the time of parallel step-up operation. In the parallel step-up operation, the voltages of the first and second batteries B1, B2 are stepped up in parallel with each other. The first step-up circuit BCNV1 steps up the voltage of the first battery B1 by using the voltage converter 11, and outputs the stepped-up voltage to the output line 26. The second step-up circuit BCNV2 steps up the voltage of the second battery B2 by using the voltage converter 11, and outputs the stepped-up voltage to the output line 26. The plurality of switching elements S1 to S4 of the voltage converter 11 include the common switching element S3 to which current is supplied from both the first and second step-up circuits BCNV1, BCNV2 at the time of the parallel step-up operation. At the time of the parallel step-up operation and when the temperature of the common switching element S3 exceeds the threshold temperature, the ECU 22 of the electric power conversion system 10 connects the trailing edge of one of the first PWM signal PWM1 and the second PWM signal PWM2 to the leading edge of the other one of the first PWM signal PWM1 and the second PWM signal PWM2, and changes the on time of at least one of the first PWM signal PWM1 and the second PWM signal PWM2 such that the sum of the on time of the first PWM signal PWM1 and the on time of the second PWM signal PWM2 in the single PWM control period falls within the range from the single PWM control period to the allowable period obtained by adding the predetermined time to the single PWM control period.

What is claimed is:

1. An electric power conversion system comprising:
   a first battery;
   a second battery;
   a voltage converter including a plurality of switching elements, the voltage converter being configured to bidirectionally step up and step down voltage between the first battery and an output line and between the second battery and the output line by turning on or off the plurality of switching elements in accordance with PWM signals,
   in parallel step-up operation in which a voltage of the first battery and a voltage of the second battery are stepped up in parallel with each other, the voltage converter being configured to step up the voltage of the first battery by using a first step-up circuit and output a stepped-up voltage to the output line, and step up the voltage of the second battery by using a second step-up circuit and output the stepped-up voltage to the output line, and
   the plurality of switching elements including a common switching element that is supplied with current from both the first step-up circuit and the second step-up circuit at the time of the parallel step-up operation; and
   an electronic control unit configured to control the first and second step-up circuits by generating a first PWM signal for step-up control over the first step-up circuit and a second PWM signal for step-up control over the second step-up circuit, the electronic control unit being configured to, at the time of the parallel step-up operation and when a temperature of the common switching element exceeds a threshold temperature, execute on time change control such that the following condition i) and condition ii) are satisfied, the electronic control unit being configured to change an on time of at least one of the first PWM signal and the second PWM signal in the on time change control,
   i) a trailing edge of one of the first PWM signal and the second PWM signal and a leading edge of the other one of the first PWM signal and the second PWM signal connect with each other, and
   ii) the sum of the on time of the first PWM signal and the on time of the second PWM signal in a single PWM control period falls within a range from the single PWM control period to an allowable period obtained by adding a predetermined time to the single PWM control period.

2. The electric power conversion system according to claim 1, wherein
   the electronic control unit is configured to execute the on time change control such that the following condition iii) is satisfied,
   iii) the sum of the on time of the first PWM signal and the on time of the second PWM signal in the single PWM control period coincides with the single PWM control period.

3. The electric power conversion system according to claim 1, wherein
   the electronic control unit is configured to, when the sum of the on time of the first PWM signal and the on time of the second PWM signal in the single PWM control period before execution of the on time change control exceeds the single PWM control period, set the allowable period such that the allowable period is shorter than the sum of the on time of the first PWM signal and the on time of the second PWM signal.

4. The electric power conversion system according to claim 1, wherein
   the electronic control unit is configured to, when the following condition iv) and condition v) are satisfied, execute the on time change control,
   iv) the sum of the on time of the first PWM signal and the on time of the second PWM signal in the single PWM control period before execution of the on time change control is shorter than the single PWM control period, and
   v) a first power loss is smaller than a second power loss, the first power loss is a power loss that arises in the common switching element based on the first PWM signal and the second PWM signal after execution of the on time change control, and the second power loss is a power loss that arises in the common switching element based on the first PWM signal and the second PWM signal before execution of the on time change control.

5. The electric power conversion system according to claim 1, wherein
   the electronic control unit is configured to, when the following condition vi) is satisfied, execute the on time change control,
   vi) a first power loss is smaller than a third power loss, the first power loss is a power loss that arises in the common switching element based on the first PWM signal and the second PWM signal after execution of the on time change control, and the third power loss is a power loss that arises in the common switching element at the time when phase shift control for shifting the trailing edge of at least one of the first PWM signal and the second PWM signal to the leading edge of the other one of the first PWM signal and the second PWM signal without extending or shortening the on time of the first PWM signal before execution of the on time change control or the on time of the second PWM signal before execution of the on time change control is executed.

6. The electric power conversion system according to claim 1, further comprising an inverter configured to convert direct-current power, output from the first step-up circuit and the second step-up circuit, to alternating-current power, wherein
   the electronic control unit is configured to change a conduction ratio in the inverter in response to a change between output voltages of the first step-up circuit and second step-up circuit before execution of the on time change control and output voltages of the first step-up circuit and second step-up circuit after execution of the on time change control.

7. The electric power conversion system according to claim 6, further comprising a rotary electric machine configured to be supplied with alternating-current power converted by the inverter, wherein
   the electronic control unit is configured to change the conduction ratio in the inverter in response to a change in efficiency of the rotary electric machine commensurate with a change between the output voltages of the first step-up circuit and second step-up circuit before execution of the on time change control and the output voltages of the first step-up circuit and second step-up circuit after execution of the on time change control.

* * * * *